(12) United States Patent
Ragan et al.

(10) Patent No.: US 11,993,396 B2
(45) Date of Patent: May 28, 2024

(54) AUTONOMOUS PACKAGE STORAGE AND RETRIEVAL SYSTEM USING A DRONE

(71) Applicant: Laitram, L.L.C., Harahan, LA (US)

(72) Inventors: Bryant G. Ragan, Metairie, LA (US); Mark Costanzo, New Orleans, LA (US); Matthew A. Lignieres, Raceland, LA (US)

(73) Assignee: Laitram, L.L.C., Harahan, LA (US)

( * ) Notice: Subject to any disclaimer, the term of this patent is extended or adjusted under 35 U.S.C. 154(b) by 871 days.

(21) Appl. No.: 17/040,632

(22) PCT Filed: Apr. 11, 2019

(86) PCT No.: PCT/US2019/026970
§ 371 (c)(1),
(2) Date: Sep. 23, 2020

(87) PCT Pub. No.: WO2019/200088
PCT Pub. Date: Oct. 17, 2019

(65) Prior Publication Data
US 2021/0114729 A1    Apr. 22, 2021

Related U.S. Application Data

(60) Provisional application No. 62/656,459, filed on Apr. 12, 2018.

(51) Int. Cl.
*B64D 9/00*    (2006.01)
*B64F 1/32*    (2006.01)
(Continued)

(52) U.S. Cl.
CPC .................. *B64D 9/00* (2013.01); *B64F 1/32* (2013.01); *B64U 10/14* (2023.01); *B64U 50/37* (2023.01);
(Continued)

(58) Field of Classification Search
CPC ... B64D 1/02; B64D 1/08; B64D 1/10; B64D 1/22; B64D 9/00; B64U 80/25
See application file for complete search history.

(56) References Cited

U.S. PATENT DOCUMENTS 7,152,827 B2    12/2006  McGeer
7,815,149 B1    10/2010  Howard et al.
(Continued)

FOREIGN PATENT DOCUMENTS

CN    105947711 A  *  9/2016
CN    205675246 U    11/2016
(Continued)

OTHER PUBLICATIONS

Supplemental European Search Report, EP16835962, dated Mar. 25, 2019, European Patent Office, Munich, Germany.
(Continued)

*Primary Examiner* — Joseph W Sanderson
(74) *Attorney, Agent, or Firm* — Catherine M. Bishop

(57) ABSTRACT

A package delivery drone comprises at least one propeller for generating lift and an article containment area for containing an article to be carried by the drone. The floor of the article containment area comprises a dynamic support surface for supporting the article and allowing the article to move into, out of and through the article containment area. The package delivery drone interfaces with a docking station having a shelf for exchanging packages with the drone.

15 Claims, 20 Drawing Sheets

(51) Int. Cl.
  *B64U 10/14* (2023.01)
  *B64U 50/37* (2023.01)
  *B64U 101/64* (2023.01)
  *B64U 80/25* (2023.01)

(52) U.S. Cl.
  CPC ........ *B64D 2009/006* (2013.01); *B64U 80/25* (2023.01); *B64U 2101/64* (2023.01)

(56) References Cited

U.S. PATENT DOCUMENTS

| | | | |
|---|---|---|---|
| 8,825,226 | B1 | 9/2014 | Worley, III et al. |
| 8,880,241 | B2 | 11/2014 | Mohamadi |
| 9,561,852 | B1 | 2/2017 | Beaman et al. |
| 9,573,684 | B2 * | 2/2017 | Kimchi .................. G01C 21/20 |
| 9,731,839 | B1 | 8/2017 | Beckman et al. |
| 9,777,502 | B2 | 10/2017 | Curlander et al. |
| 9,845,165 | B2 | 12/2017 | Michalski et al. |
| 9,957,048 | B2 | 5/2018 | Gil |
| 10,124,912 | B2 * | 11/2018 | Walsh .................. B64C 39/024 |
| 10,403,155 | B2 * | 9/2019 | Kimchi ................ G06Q 10/083 |
| 10,418,830 | B1 * | 9/2019 | Parodi .................. G01V 5/0091 |
| 10,434,885 | B2 | 10/2019 | Antonini ............... B64C 39/024 |
| 10,703,507 | B2 * | 7/2020 | Comerford .......... A47G 29/141 |
| 10,836,488 | B2 | 11/2020 | Costanzo et al. |
| 11,117,680 | B2 * | 9/2021 | Walsh .................. A01M 29/16 |
| 11,168,487 | B2 * | 11/2021 | Wankewycz ............. E04H 6/44 |
| 11,195,422 | B2 * | 12/2021 | Kimchi ................ B64C 39/024 |
| 11,479,360 | B2 * | 10/2022 | Costanzo ................ B65G 17/24 |
| 11,749,125 | B2 * | 9/2023 | Kimchi .................. G01C 21/20 |
| | | | 701/3 |
| 2005/0258019 | A1 | 11/2005 | Tiberi |
| 2008/0175697 | A1 | 7/2008 | Foster et al. |
| 2010/0012769 | A1 | 1/2010 | Alber et al. |
| 2011/0084162 | A1 | 4/2011 | Goossen et al. |
| 2014/0032034 | A1 | 1/2014 | Raptopoulos et al. |
| 2014/0209735 | A1 * | 7/2014 | Corey ..................... B64D 1/22 |
| | | | 244/121 |
| 2014/0217230 | A1 | 8/2014 | Helou, Jr. |
| 2015/0120094 | A1 | 4/2015 | Kimchi et al. |
| 2015/0175276 | A1 | 6/2015 | Koster |
| 2015/0183528 | A1 * | 7/2015 | Walsh ................... A01M 29/16 |
| | | | 244/114 R |
| 2016/0196756 | A1 | 7/2016 | Prakash et al. |
| 2016/0251088 | A1 | 9/2016 | Melish et al. |
| 2016/0257423 | A1 | 9/2016 | Martin |
| 2017/0039510 | A1 | 2/2017 | Ogilvie et al. |
| 2017/0110017 | A1 * | 4/2017 | Kimchi .................... B64D 1/12 |
| 2017/0217323 | A1 | 8/2017 | Antonini et al. |
| 2017/0316701 | A1 | 11/2017 | Gil et al. |
| 2018/0196418 | A1 | 7/2018 | Meier et al. |
| 2018/0229843 | A1 | 8/2018 | Costanzo et al. |
| 2018/0245365 | A1 * | 8/2018 | Wankewycz ............. H02J 7/00 |
| 2019/0002129 | A1 * | 1/2019 | Walsh .................. G05D 1/0202 |
| 2019/0135433 | A1 | 5/2019 | Goovaerts et al. |
| 2019/0217971 | A1 * | 7/2019 | Comerford .......... A47G 29/141 |
| 2019/0347942 | A1 * | 11/2019 | Kimchi .................... B64D 1/12 |
| 2021/0039785 | A1 * | 2/2021 | Costanzo .............. B64C 39/024 |
| 2021/0380277 | A1 * | 12/2021 | Walsh ....................... B64F 1/32 |
| 2022/0058965 | A1 * | 2/2022 | Kimchi ................ G05D 1/0088 |

FOREIGN PATENT DOCUMENTS

| | | | |
|---|---|---|---|
| CN | 106552771 A | 4/2017 | |
| CN | 107108029 A | 8/2017 | |
| DE | 10058072 A1 * | 6/2002 | ............... B64D 1/22 |
| DE | 102014007995 A1 | 12/2015 | |
| EP | 3192357 A1 | 7/2017 | |
| KR | 101802693 B1 * | 11/2017 | |
| WO | 2015061008 A1 | 4/2015 | |
| WO | 2015103411 A1 | 7/2015 | |
| WO | 2017027780 A1 | 2/2017 | |
| WO | 2017041145 A1 | 3/2017 | |
| WO | 2017075907 A1 | 5/2017 | |

OTHER PUBLICATIONS

Notice of Reasons for Refusal, Japanese Patent Application No. 2018-505436, dated May 19, 2020, Japanese Patent Office.
Extended European Search Report, EP19786232.9, dated Nov. 30, 2021, European Patent Office, Munich, Germany.
Office Action, Chinese Patent Application No. 201980025335.X dated Aug. 29, 2023, CNIPA.

* cited by examiner

US 11,993,396 B2

AUTONOMOUS PACKAGE STORAGE AND RETRIEVAL SYSTEM USING A DRONE

RELATED APPLICATIONS

The present application claims priority to U.S. Provisional Patent Application No. 62/656,459 filed Apr. 12, 2018 and entitled "Autonomous Package Storage and Retrieval System Using a Drone", the contents of which are herein incorporated by reference.

BACKGROUND

The invention relates generally to the delivery of articles using drones. More particularly, the invention relates to the loading, retention and unloading of articles onto and from a drone.

Drones are unmanned aerial vehicles (UAVs) that may be used for a variety of purposes, such as delivering packages or transporting other articles from one location to another. The current state of the art delivery drones use overhead grippers to secure a payload. This leaves the payload exposed and if the grip is not secure, the payload could fall from the sky. There is a need for a more secure, efficient and effective method for loading, retaining and unloading payload on a drone.

Drones can be very useful for an automated storage and retrieval system (ASRS) warehouse. Currently, drones are usually positioned to pick up and deliver from an open launch location to an open delivery destination. Difficulties are encountered when attempting to deploy a drone for delivery to or retrieval from a vertical structure, such as a storage rack or a multi-story building. The drone rotors make it difficult to position the drone close enough to the target location. In addition, it can be difficult to accurately position a drone for package delivery.

SUMMARY

The present invention provides a delivery drone that includes a dynamic support surface for carrying an article that facilitates loading and unloading of the article onto and from the drone. The dynamic support surface forms a floor of an article containment area. The delivery drone interfaces with a docking station to load and unload packages to and from the drone.

According to one aspect, a system for storing and retrieving packages, comprises a drone having a frame, at least one propeller for generating aerodynamic lift, an article containment area and a first coupling element and a docking station for the drone. The docking station comprises a shelf for a package and a second coupling element for mating with the first coupling element, such that the article containment area aligns with the shelf.

According to another aspect, a modular drone for package delivery comprises a first module having a frame, at least one propeller for generating aerodynamic lift and a first coupling element. A second module has an article containment area for containing an article to be carried by the drone and a second coupling element for mating with the first coupling element to form the modular drone.

According to another aspect a method of docking a drone at a docking station for package exchange comprises the steps of approaching an upper coupling element at the docking station, guiding an upper coupling element on the drone into the upper coupling element at the docking station and aligning an article containment area of the drone with a shelf at the docking station.

BRIEF DESCRIPTION OF THE DRAWINGS

These features and aspects of the invention, as well as its advantages, are described in more detail in the following description, appended claims, and accompanying drawings, in which:

DETAILED DESCRIPTION

The present invention provides a system and method for storing and retrieving packages to and from a structure using a drone. The invention will be described relative to certain illustrative embodiments, though those skilled in the art will recognize that the invention is not limited to the illustrative embodiments.

Figure 1:
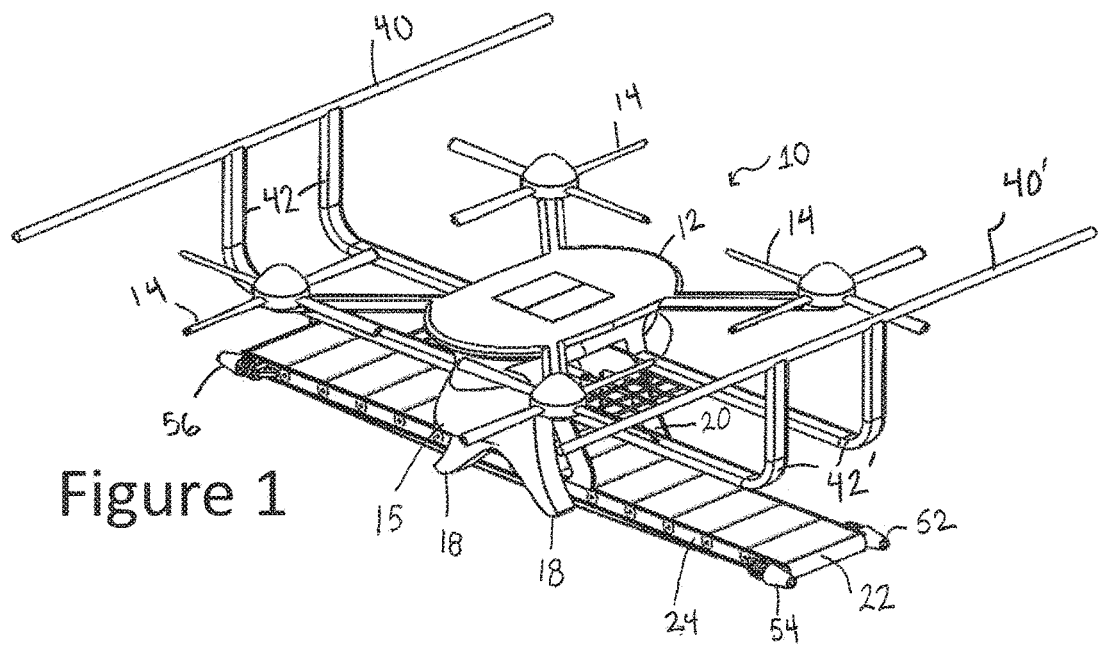
FIG. 1 is an isometric view of a package delivery drone having a dynamic support surface, according to an embodiment of the invention.

Referring to FIG. 1, a drone 10 of an embodiment of the invention includes a frame 12, one or more propellers 14, shown as propeller blades, forming an aerodynamic surface that generates lift and a motor (not shown) for rotating the propellers 14. The illustrative drone further includes an article containment area 20 for containing an article or payload to be retrieved, delivered or otherwise moved using the drone. The illustrative article containment area 20 is formed below the propellers 14, but the invention is not so limited. The illustrative frame 12 includes aerodynamic nose cones 15, which can house antenna, batteries, electronics and other components. The illustrative frame 12 forms feet 18 straddling the article containment area 20, which can be used to position and land the drone, as well as, or alternatively, to provide a charging port for the drone.

A dynamic support surface, shown as a conveyor belt 22, defines the bottom of the article containment area 20. The upper span of the conveyor belt 22 forms the floor of the article containment area 20 for supporting an article within the article containment area. The lower span of the conveyor belt 22 may form or face the bottom of the drone. The illustrative conveyor belt 22 is mounted on a conveyor frame 24 extending from a first end to a second end. In the illustrative embodiment, the conveyor frame extends outside of the area of the propellers 14, but the invention is not so limited.

As used herein, a "dynamic support surface" refers to a surface that allows movement of an article into and out of an article containment area of a drone and that supports the article from the bottom while the article is in an article containment area of the drone. Examples include, but are not limited to, conveyor belts, rollers, low friction flat surfaces, a flexible surface, mesh, a movable or retractable surface, a tiltable surface and other surfaces that would be apparent to one of ordinary skill in the art, and combinations thereof. The dynamic support surface can be driven through any suitable means and can comprise any suitable material, including, but not limited to, plastic, metal, fiber, rubber and others known in the art. For example, a conveyor belt can be driven by motor-driven rollers within the frame, sprockets, pulleys or other suitable means known in the art.

In one embodiment, a portion of the article containment area 20, such as the dynamic support surface, is formed on a separate module from the frame and propellers. The conveyor frame 24 includes latching mechanism to connect all or a portion of the article containment area to the upper frame 12.

Figure 2:
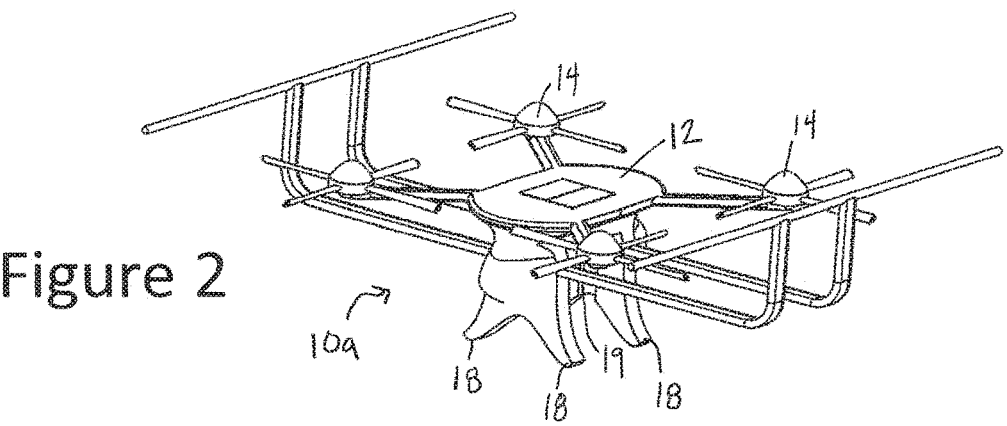
FIG. 2 is an isometric view of a propeller module for forming a drone of an embodiment of the invention.

For example, FIG. 2 shows a basic propeller module 10a, including the propellers 14, upper frame 12 and latching receptacles 19, which can be ratchets, formed in a space in the frame above the feet.

Figure 3:
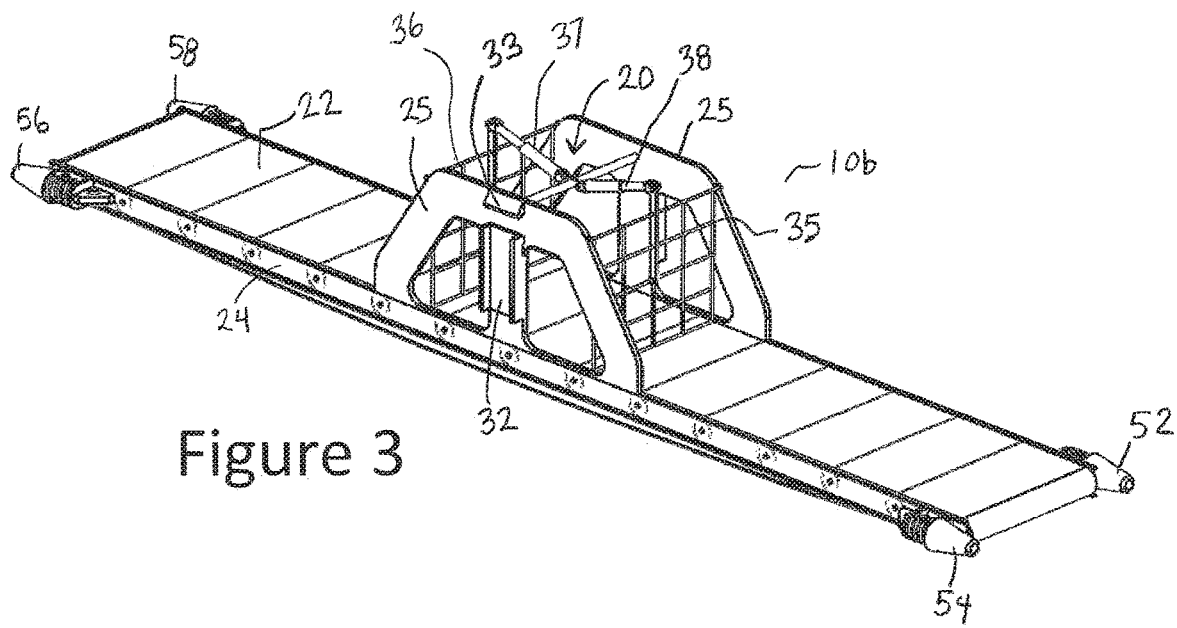
FIG. 3 is an isometric view of an article supporting module for forming a drone of an embodiment of the invention.

FIG. 3 shows an embodiment of an article containing module 10b suitable for latching to the basic propeller module 10a of FIG. 2 to form a drone 10 capable of carrying packages. The article containing module 10b includes a dynamic support surface, shown as a conveyor belt 22 and a conveyor frame 24 for supporting the conveyor belt 22. The conveyor frame 24 includes vertical walls 25 defining the sides of the article containment area 20. The vertical walls 25 include a module attachment guide 32 and pawl 33 for latching into the latching receptacles 19 in the basic propeller module 10 to couple the two modules 10a, 10b together. In one embodiment, the latch can be configured to only be released when the drone is landed. Any suitable means for connecting the two modules 10a, 10b together may be used.

Figure 4:
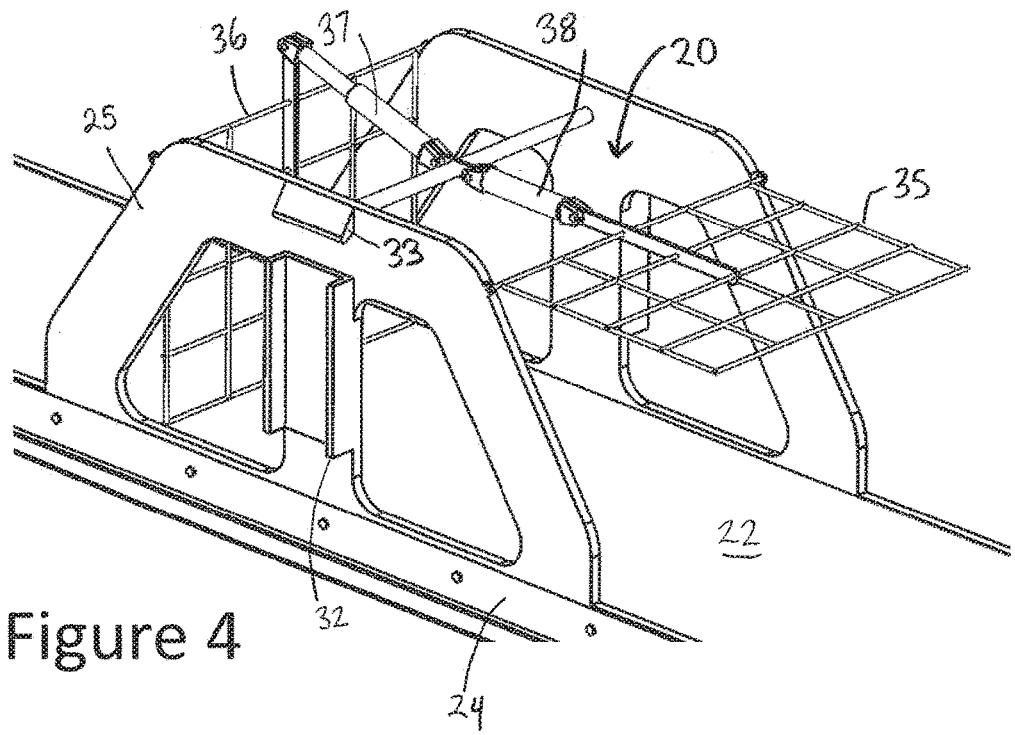
FIG. 4 is a detailed view of an article containment area of the article supporting module of FIG. 3.

The illustrative article containing module 10b includes first and second gates 35, 36 for the article containment area, though the invention is not so limited, and the drone can omit the gates or use other means for containing an article. FIG. 4 is a detailed view of the article containment area 20, with a first gate 35 open and a second gate 36 closed. Actuators 37, 38 can be used to open and close the gates 35, 36 to allow access to or containment of the article containment area 20. The actuators can be electric, pneumatic or use any suitable means for actuating the gates 35, 36. The gates 35, 36 can operate independently or in synch.

The drone 10 includes a coupling element for coupling the drone to a docking station for loading and unloading packages into and out of the article containment area 20. For example, referring back to FIG. 1, in the illustrative embodiment the coupling element comprises a docking bar 40 that extends perpendicular to the conveying direction of the conveyor belt 22, outside of the area of the propellers 14. Arms 42 connect the docking bar 40 to the frame 12. The drone 10 can include a second docking bar 40' and arms 42' mirroring the first bar 40 and arms 42 to provide symmetry and balance.

Figure 5:
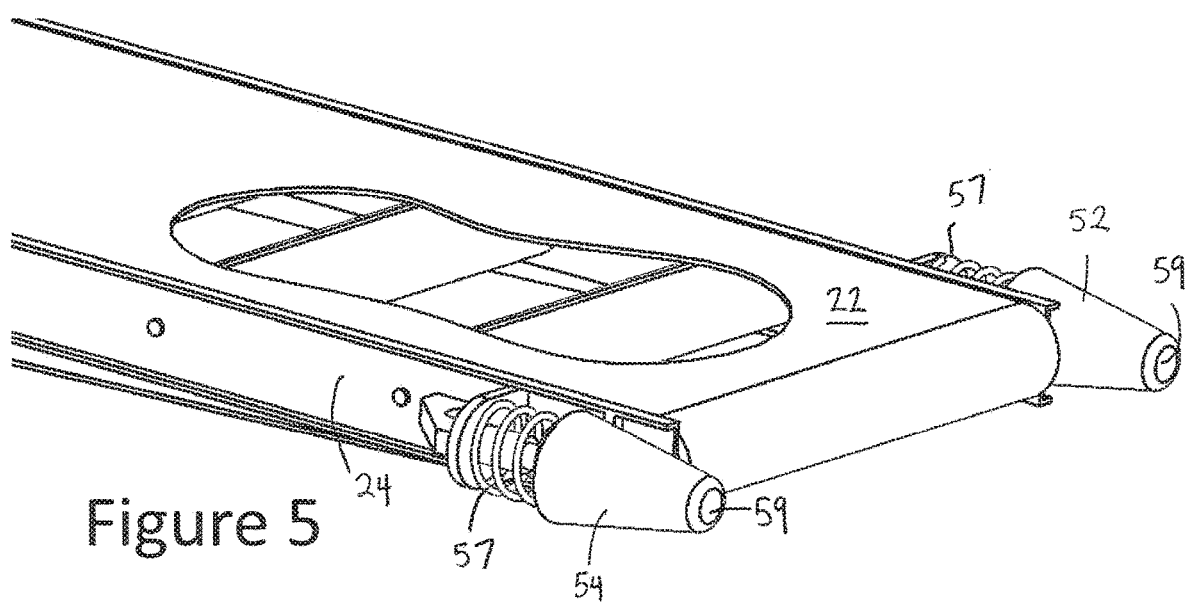
FIG. 5 is a detailed view of an end portion of the article supporting module, showing docking cones according to an embodiment of the invention.

The drone 10 includes a secondary coupling element to facilitate placement of the drone at a docking station. In one embodiment, the secondary coupling element comprises docking cones, such as damper cones 52, 54, 56, 58 formed at each end of the conveyor frame 24. The damper cones can be received in openings in the docking station. Referring to FIG. 5, each damper cones 52, 54, 56 and-or 58 can comprise a tapering cone structure having an exposed electrical contact 59 at the tapered end. Shock absorbers, shown as springs 57, can be used to cushion the docking process. The damper cones can form electrical contacts for powering the drone 10 when docked.

The coupling elements are not limited to the illustrative embodiments, and can comprise any suitable mechanical, magnetic, electromagnetic device for coupling two elements or other means of coupling known in the art.

Figure 6:
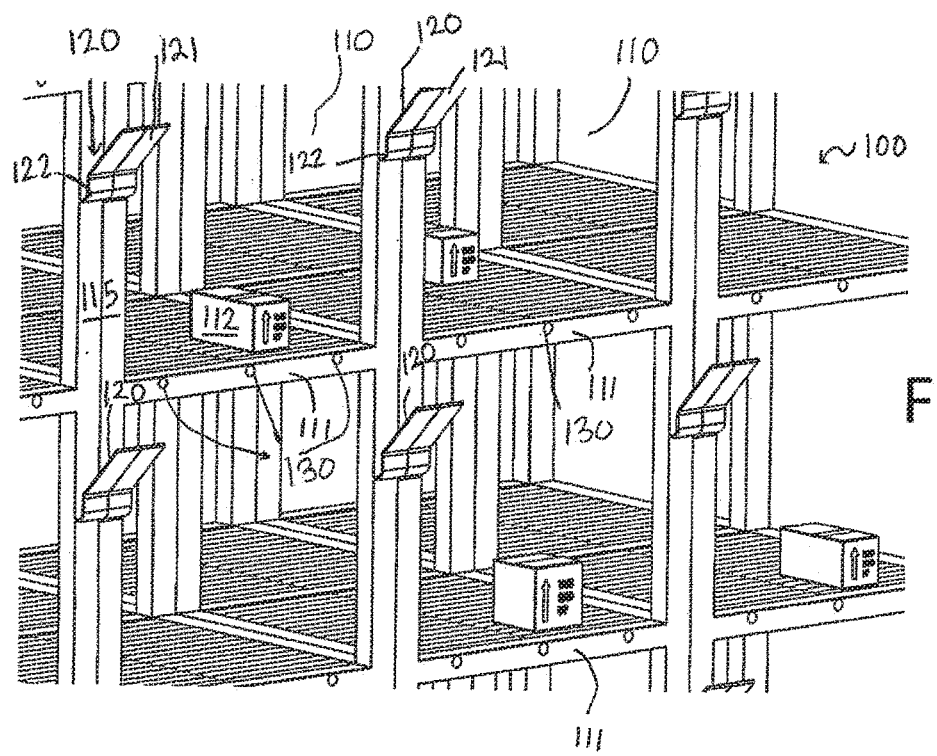
FIG. 6 shows a docking station in a warehouse capable of interfacing with the drone of FIG. 1.
Figure 7:
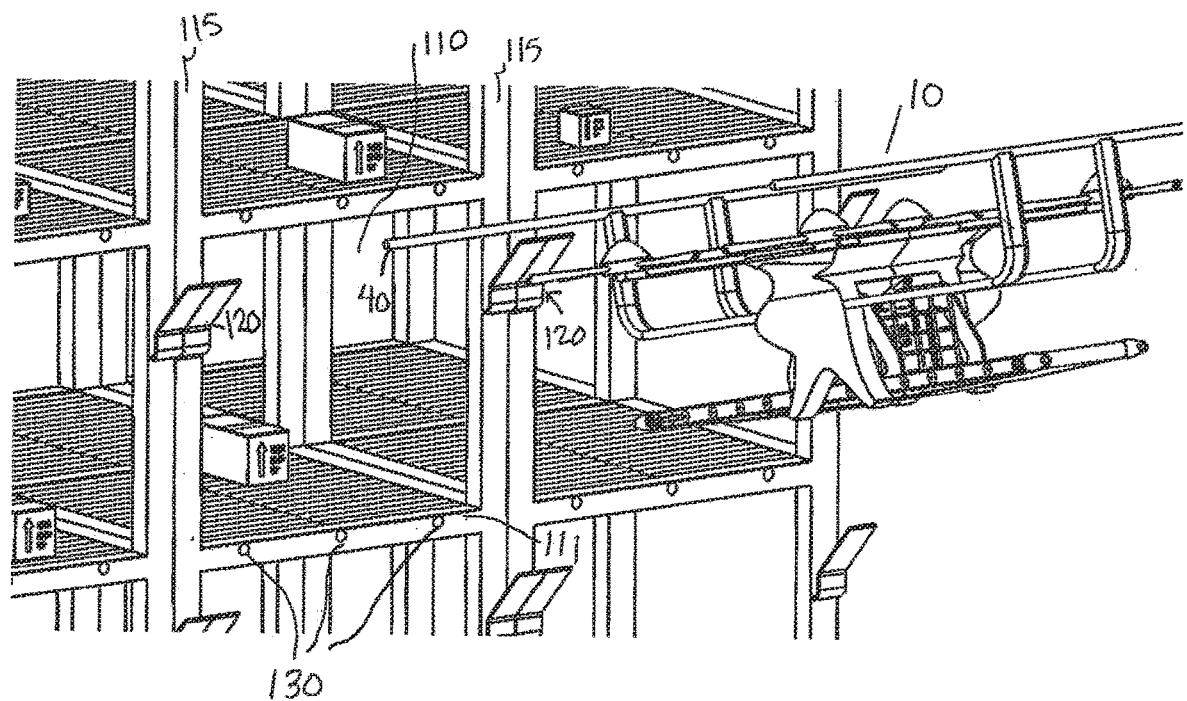
FIG. 7 shows the drone of FIG. 1 approaching the docking station of FIG. 6.

FIG. 6 shows a warehouse 100 including a plurality of docking stations 110 suitable for interfacing with a drone having an article containment area with a dynamic support surface, such as the drone 10 of FIG. 1. An illustrative docking station 110 includes an opening for interfacing with a package carrier, such as the drone 10. The docking station 110 further includes a shelf 111 or other structure for containing one or more packages 112 and docking devices for coupling a delivery drone 10 to the docking station. The shelf 111 can comprise a dynamic support surface, including powered rollers, a conveyor belt, static, low-friction surface, a movable or retractable surface, gravity rollers or other means for moving, loading and-or discharging a package.

The docking station 110 is not limited to a warehouse, but can be any vertical structure to which the delivery or retrieval of packages using a drone may be applicable.

The illustrative docking station 110 includes upper coupling elements, shown as hooks 120 extending from vertical members 115, and lower receptacles 130, formed in or below the shelf 111. The hooks 120 are designed to guide and latch onto the docking arm 40 of the drone 10, while the lower receptacles 130 are positioned and sized to receive the docking cones 52, 54, 56 or 58. The illustrative hooks 120 include an upper section 121 comprising a planar portion extending at an angle relative to the vertical member 115. The upper section 121 forms a tapering space between the vertical member 115 and upper section 121. Each hook 120 further includes a lower section 122 comprising a curved seat for pivotally seating a docking arm 40.

Lower receptacles 130 can include pins forming power connections to provide power to a docked drone via contacts 59. In one embodiment, the lower receptacles have a wider cone angle than the docking cones for ease of fit.

Figure 8:
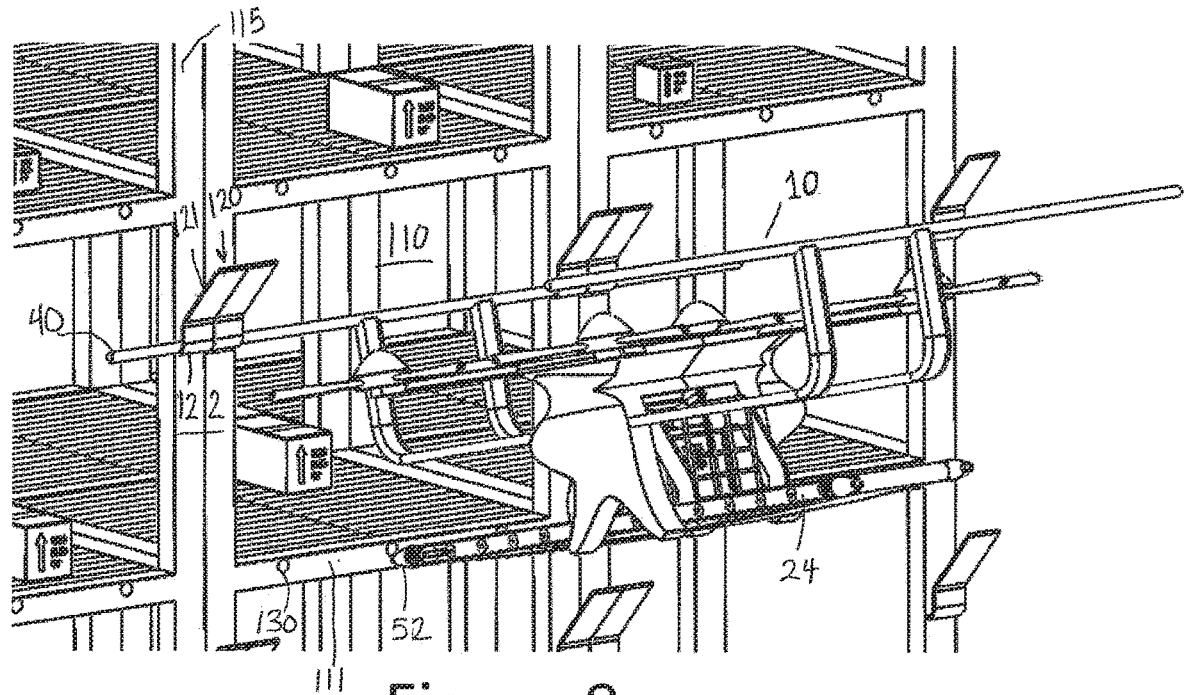
FIG. 8 shows the drone of FIG. 1 engaging hooks of the docking station according to an embodiment of the invention.
Figure 9:
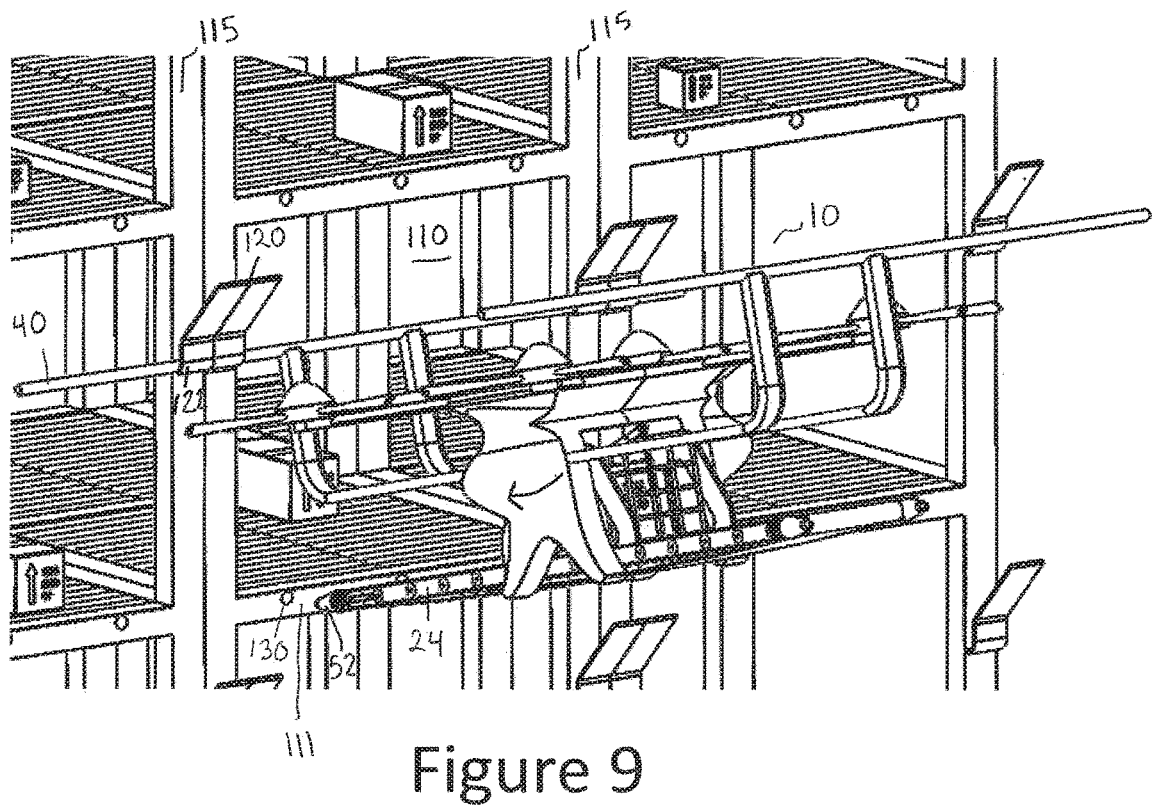
FIG. 9 shows the drone of FIG. 1 pivoting downwards towards an engaged position with the docking station of FIG. 6.
Figure 10:
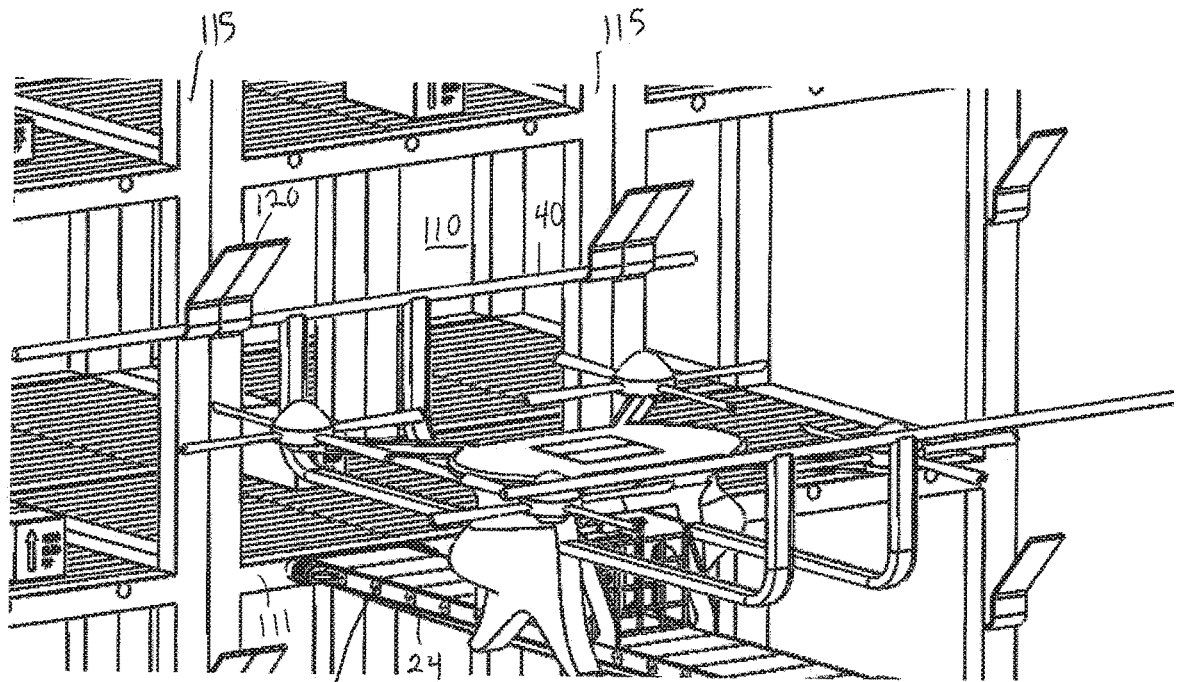
FIG. 10 shows the drone of FIG. 1 in a docked position for package exchange with the docking station of FIG. 6.

As shown in FIG. 7-11, to dock a drone 10 to receive or drop off package from or to the docking station 110, the drone 10 first approaches the docking station 110, preferably at an angle, with the docking bar 40 tilted towards the docking station 110. The drone 10 can include sensors to detect contact between the docking arm 40 and the hook 120, or other suitable coupling elements. The drone can use inertial guidance and-or a vision system for navigation or any other suitable means known in the art. If carrying a package, the package is contained within the package containment area 20 and the gates 35, 36 are closed. The drone 10 approaches the docking station 110 with the docking bar 40 approaching the tops of the hooks 120. The drone moves so that the docking bar 40 is inserted in the upper section 121 of the hooks 120. Then, the drone descends, guided by the hook and docking bar, until the docking bar 40 is seated in the lower section 122, as shown in FIG. 8. The drone 10 then rotates down about the docking bar 40, as shown in FIG. 9. As shown in FIG. 10, the drone continues to pivot about the seated docking bar 40 to bring the dynamic support surface 22 into alignment with (or even slightly above) and adjacent to the shelf 111. The docking cones 52, 54 are inserted into the receptacles 130 to cushion the engagement between the shelf 111 and drone 10, and, optionally, to charge the drone 10.

Figure 11:
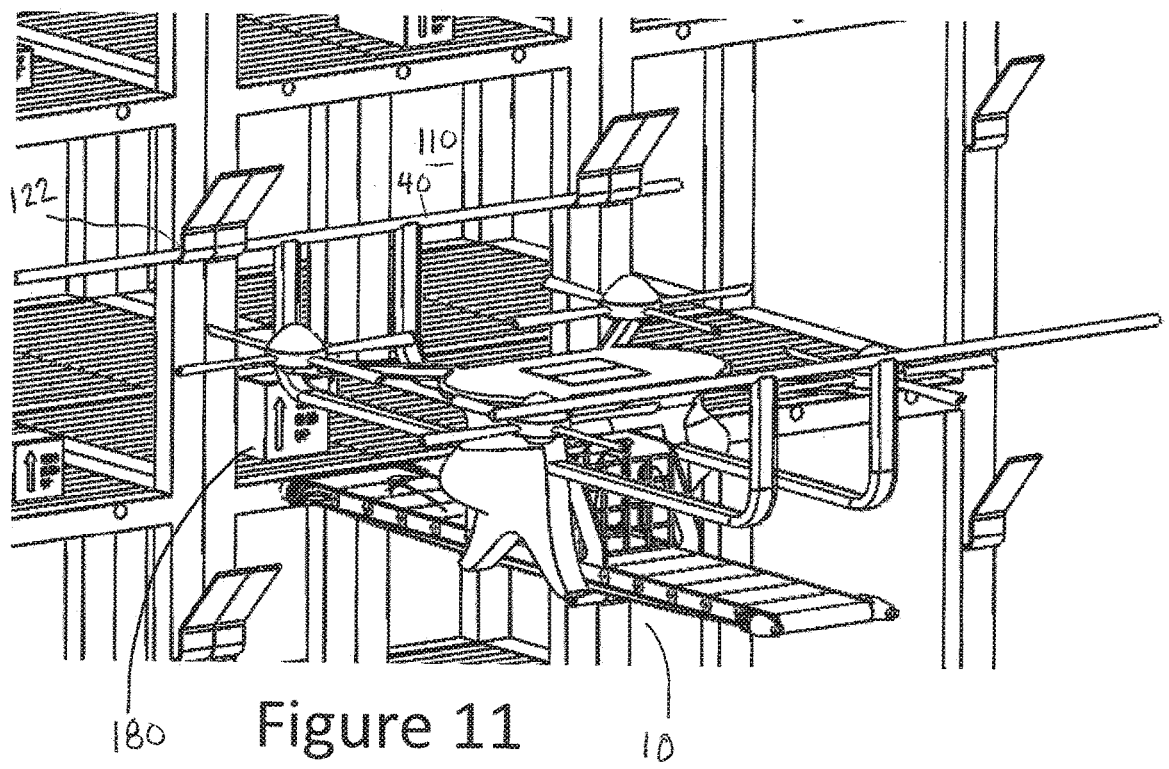
FIG. 11 shows a package being offloaded from a drone onto a shelf of the docking station of FIG. 6.

If a package is to be unloaded, a gate 25 to the article containment 20 area opens, and the conveyor belt 22, or another dynamic surface, is activated to transfer the package 180 from the drone 10 to the shelf 111, as shown in FIG. 11. Powered rollers or other conveyance means can be used to further move the package once delivered to the shelf 111. If a package is to be loaded onto the drone, the shelf 111 pushes the package onto the drone conveyor belt 22 and into the article containment area 20.

While docked, the drone 10 can be charged using power connections in the shelf 111. Other suitable maintenance, such as recalibration of inertial guidance, and battery charging can be performed while docked as well.

In another embodiment, the dynamic support surface 22 can tilt up to allow the package to fall down into the docking station. The dynamic support surface could comprise a smooth sliding surface, rollers, or other suitable dynamic surface that allows the package to deploy using gravity as the motivating force. The entire drone could tilt to cause the package to fall, or the dynamic support surface could tilt relative to the rest of the drone to deploy the package. The gates 35 or 36 to the article containment area 20 can be programmed to only open to release the product when the dynamic support surface reaches a sufficient tilt angle.

Figure 12:
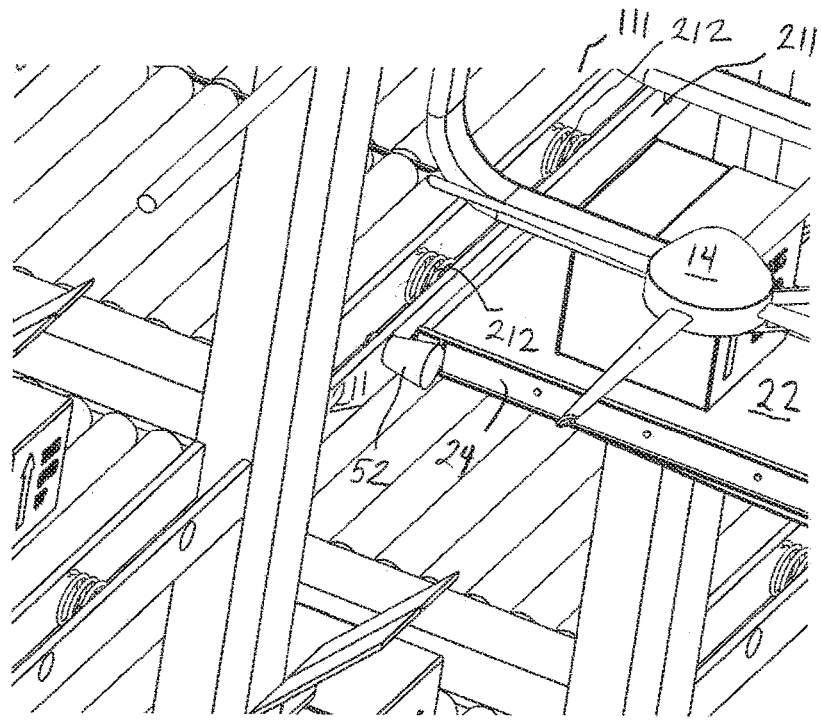
FIG. 12 is a detailed view of a shelf-integrated damper in a docking station for a drone according to an embodiment of the invention.

In another embodiment, shown in FIG. 12, a docking station shelf 111 can include an integrated damper to cushion the docking process, allowing the springs or other dampers to be omitted from the drone itself. The illustrative shelf-integrated damper comprises a floating face 211 on the shelf that includes springs 212 or other damping means to soften the engagement between the drone 10 and the shelf.

Figure 13:
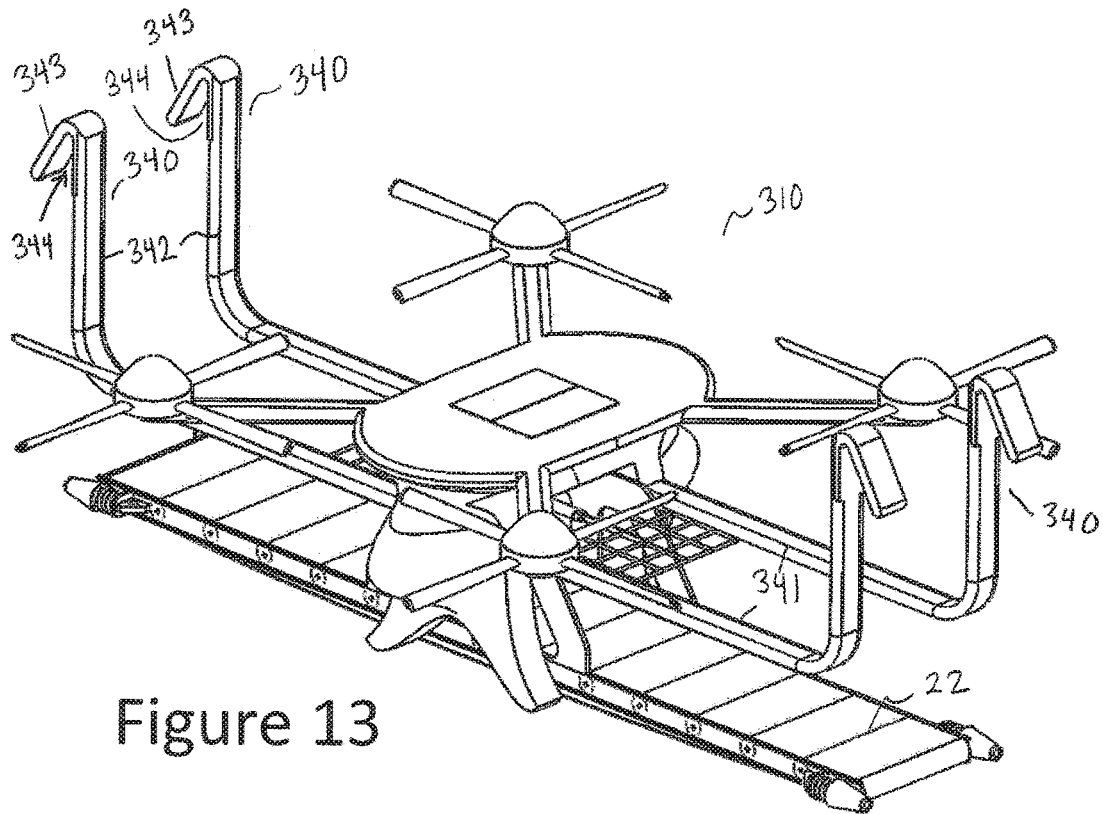
FIG. 13 is an isometric view of a package delivery drone according to another embodiment of the invention.
Figure 14:
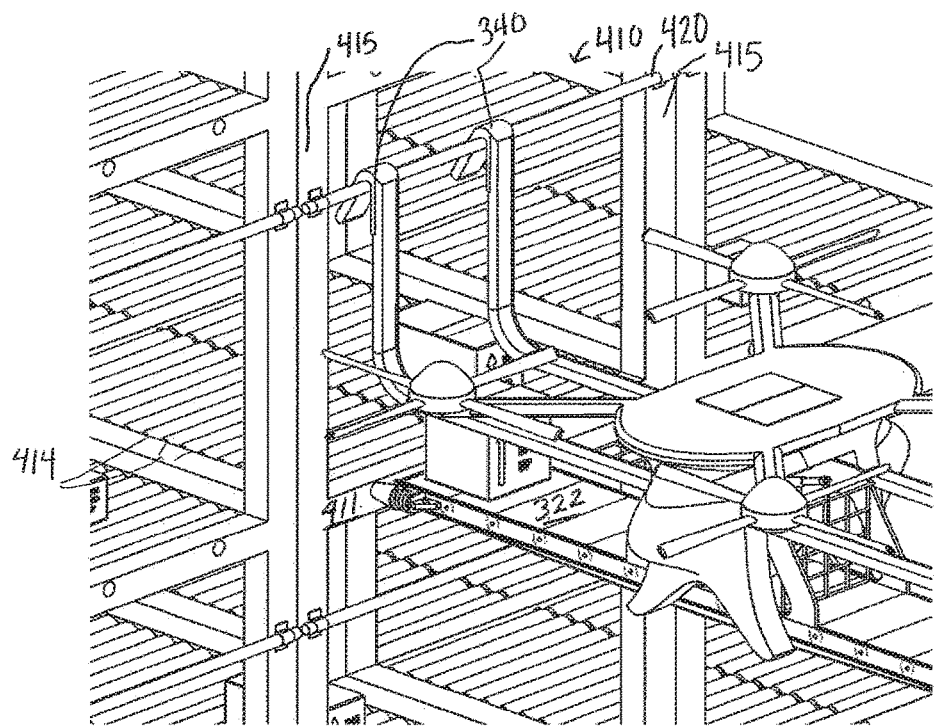
FIG. 14 shows the drone of FIG. 13 in a docked position at a docking station.
Figure 15:
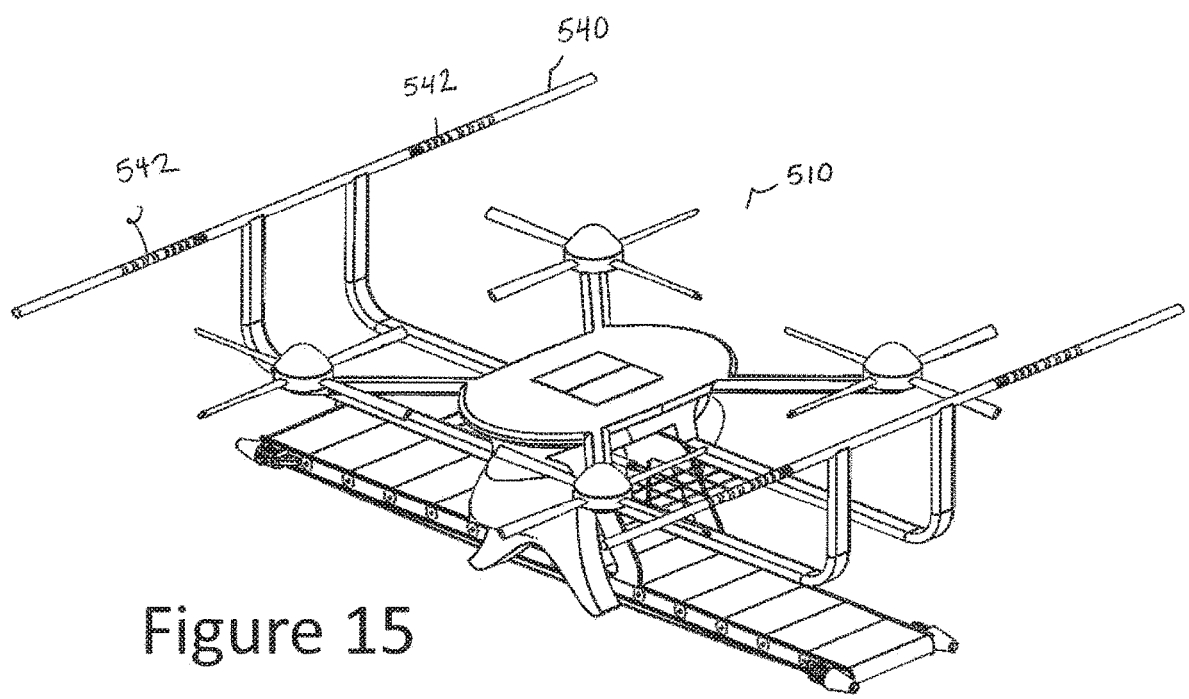
FIG. 15 is an isometric view of a package delivery drone according to another embodiment of the invention.
Figure 16:
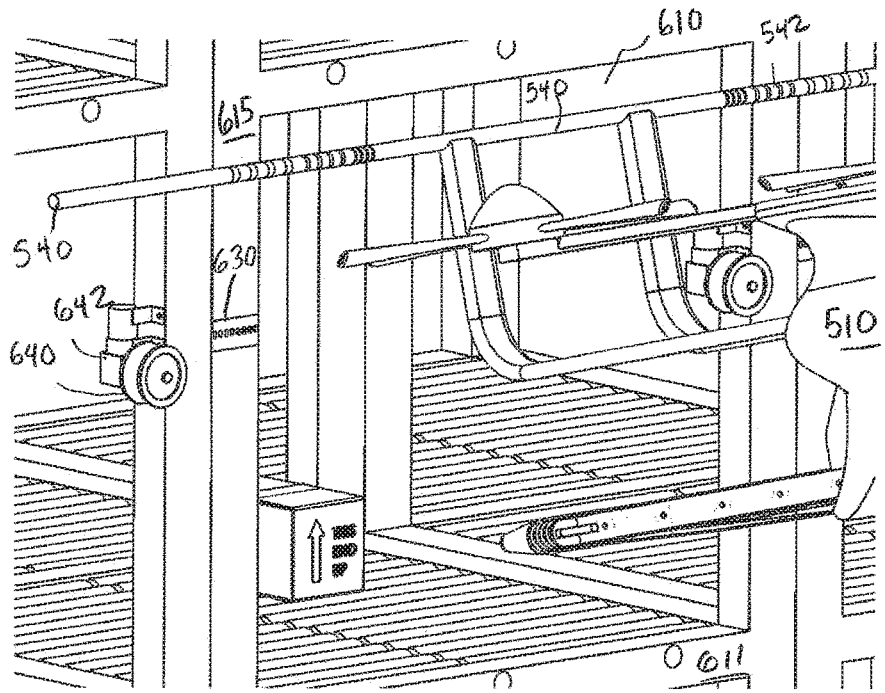
FIG. 16 shows the drone of FIG. 15 approaching a docking station.
Figure 17:
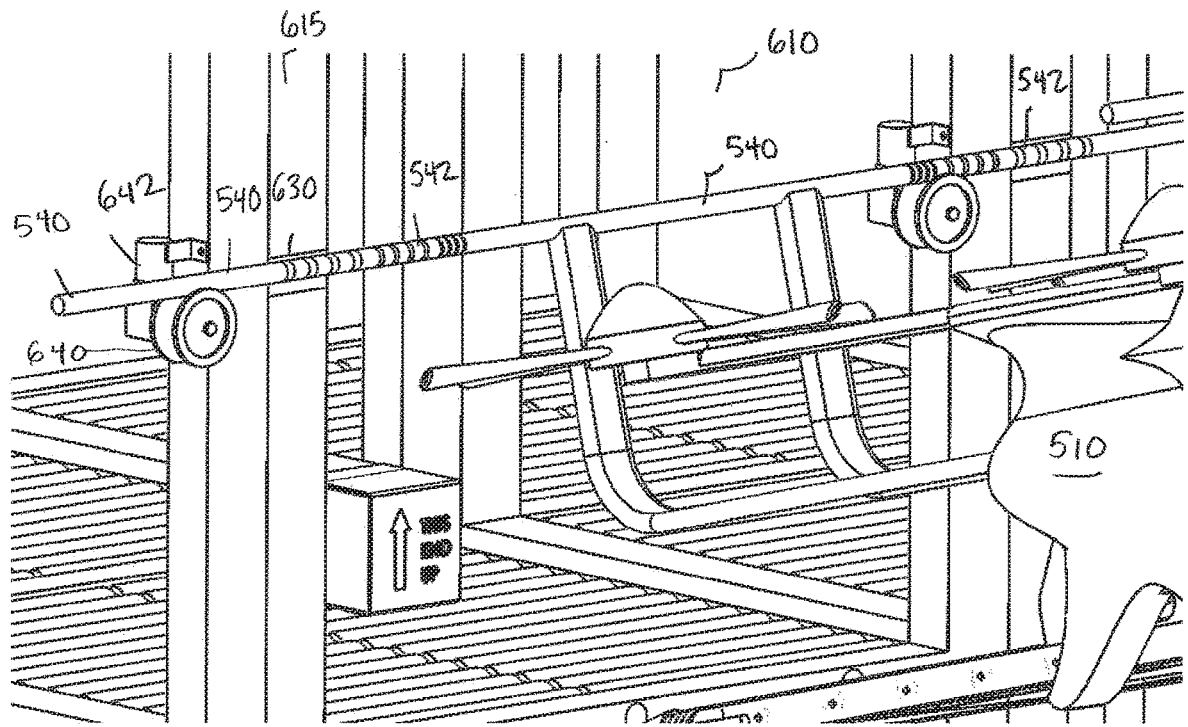
FIG. 17 shows the drone of FIG. 15 in an initial engagement with a docking station.
Figure 18:
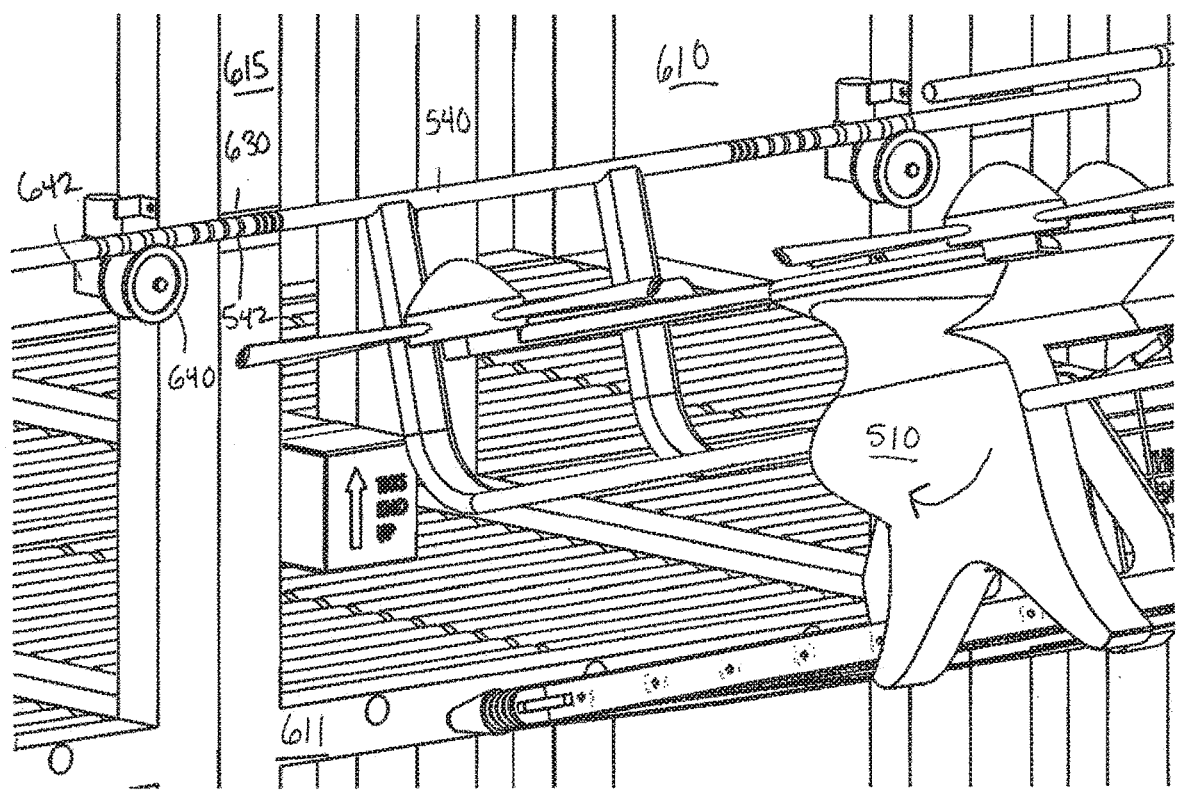
FIG. 18 shows the drone of FIG. 15 during lateral adjustment at a docking station.

FIG. 13 shows another embodiment of a drone 310 having coupling elements for docking the drone at a shelf of a docking station. The illustrative drone 310 has hooks 340 for docking the drone at a docking station. The hooks 340 extend from the end of bars 341 extending above the conveyor belt 22 in the direction of belt travel, outside of the propeller region. The illustrative hooks 340 comprise a vertical base 342 extending above the rotors and a hooked end 343 comprising a beam extending out and down at an angle from the vertical base 342 to form a tapering catch region 344. As shown in FIG. 14, the associated docking station 410 has a docking bar 420 extending across the opening for coupling to the hooks 340. The illustrative docking bar 420 is connected at each end to a vertical member 415. The illustrative drone 310 engages the docking station 410 to offload or load a package by approaching the docking station, engaging the docking bar 410 with the hooks 340 until the docking bar 410 is seated in the top of the hooks 340, then rotating down into engagement and alignment with the shelf 411. Then, the conveyor belt 322 can be activated and the associated gate 25 or 26 opened to offload or load a package to or from the shelf 411. The shelf 411 can comprise a dynamic surface, such as powered rollers 414, or another suitable conveyor, to push or pull a package to or from the drone 310.

Referring to FIGS. 15-19, a docking bar 540 on a drone may include indicia 542 for guiding the drone during the docking process. The indicia 542 may be ferrous material, permanent magnets, optical marks, RFID or other suitable markings forming a linear pattern that can be detected by sensors 630 mounted on the vertical members 615 of an associated docking station 610.

Figure 19:
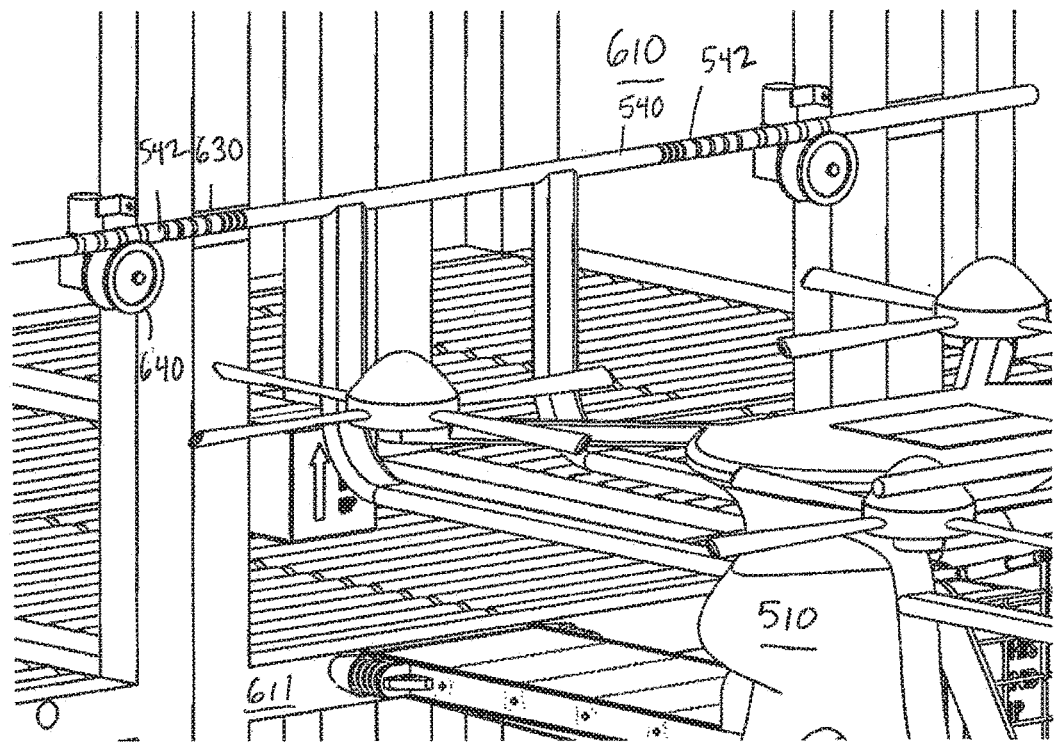
FIG. 19 shows the drone of FIG. 15 in a docked position at a docking station.

An associated docking station 610 includes a sensor array 630 on vertical members 615 for detecting the position of the drone 510 based on the indicia 542 and a docking bar seat, shown as sheaves 640 connected to gear motors 642. After the docking bar 540 engages the sheaves 640, the sheaves 640 rotate to properly laterally locate the drone 510. Then, the drone pivots downwards into engagement with the shelf 611, as shown in FIG. 19.

Figure 20:
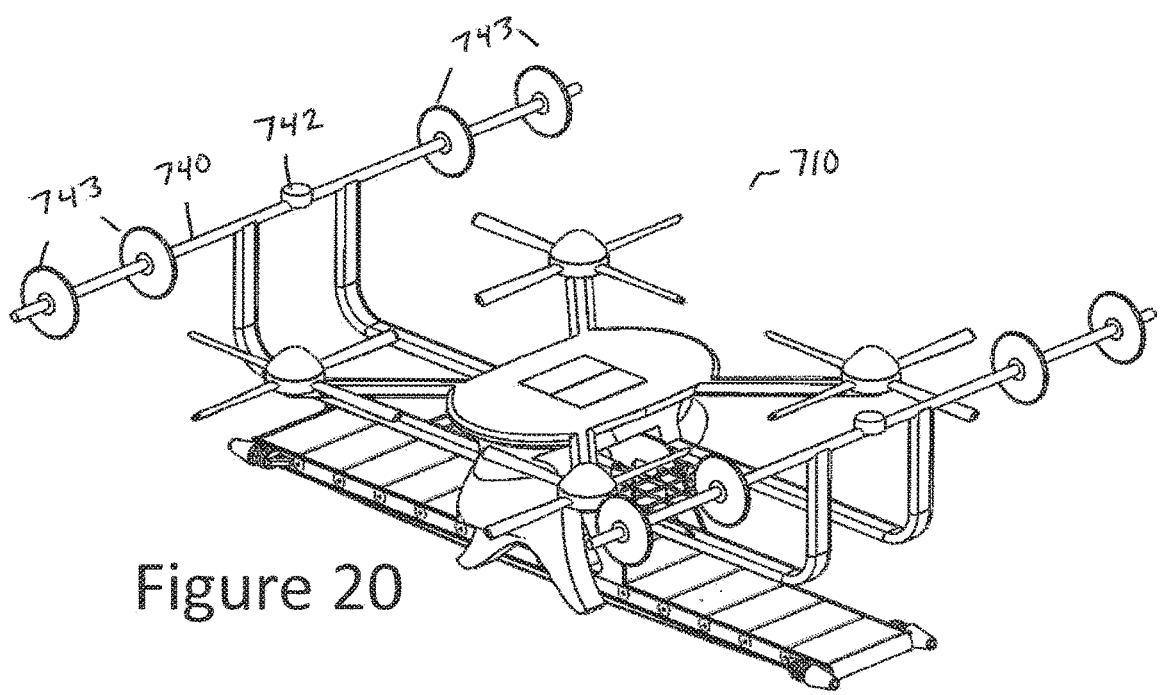
FIG. 20 is an isometric view of a package delivery drone according to another embodiment of the invention.
Figure 21:
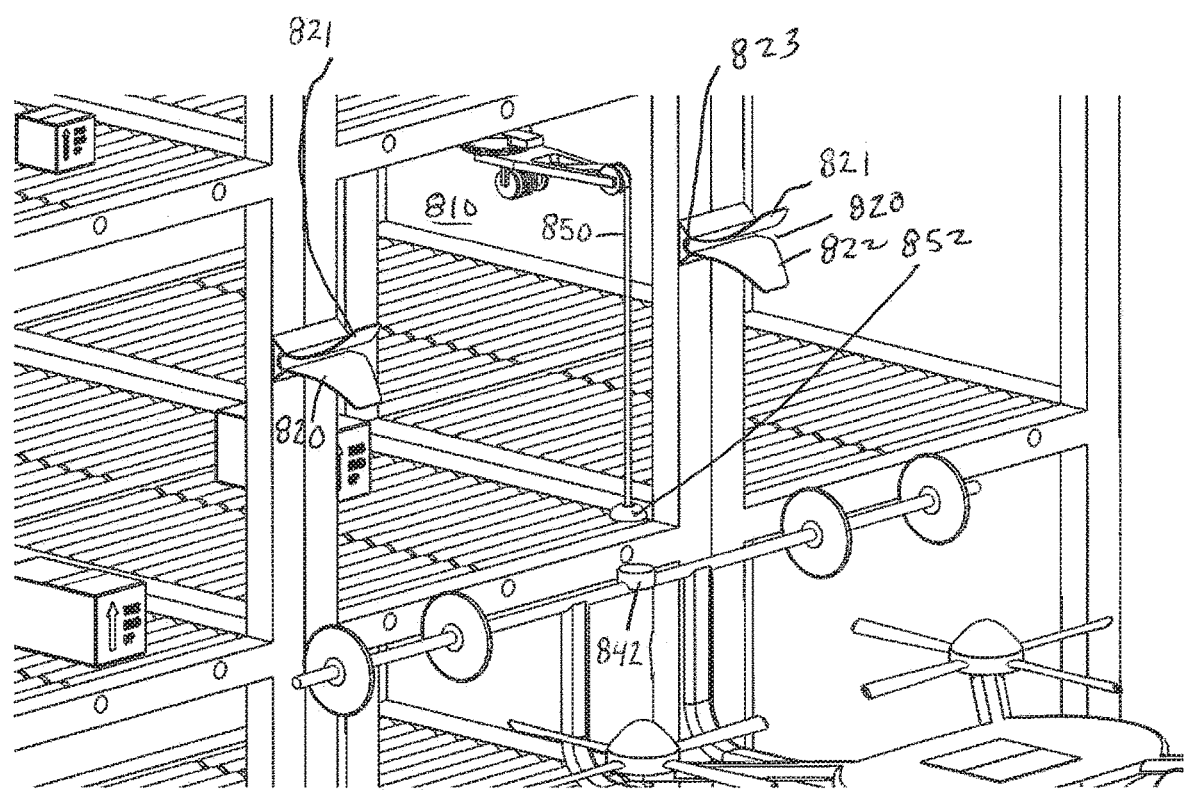
FIG. 21 shows a docking station suitable for interfacing with the drone of FIG. 20.
Figure 22:
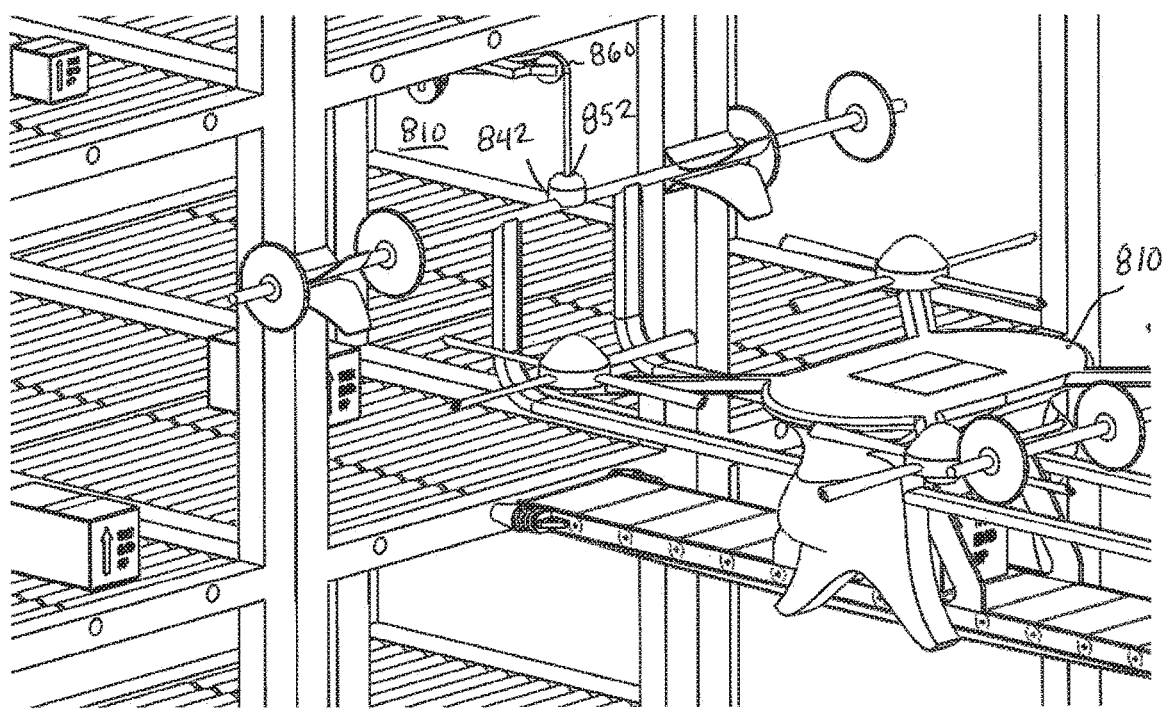
FIG. 22 shows the drone of FIG. 20 in a docked position with the docking station of FIG. 21.
Figure 23:
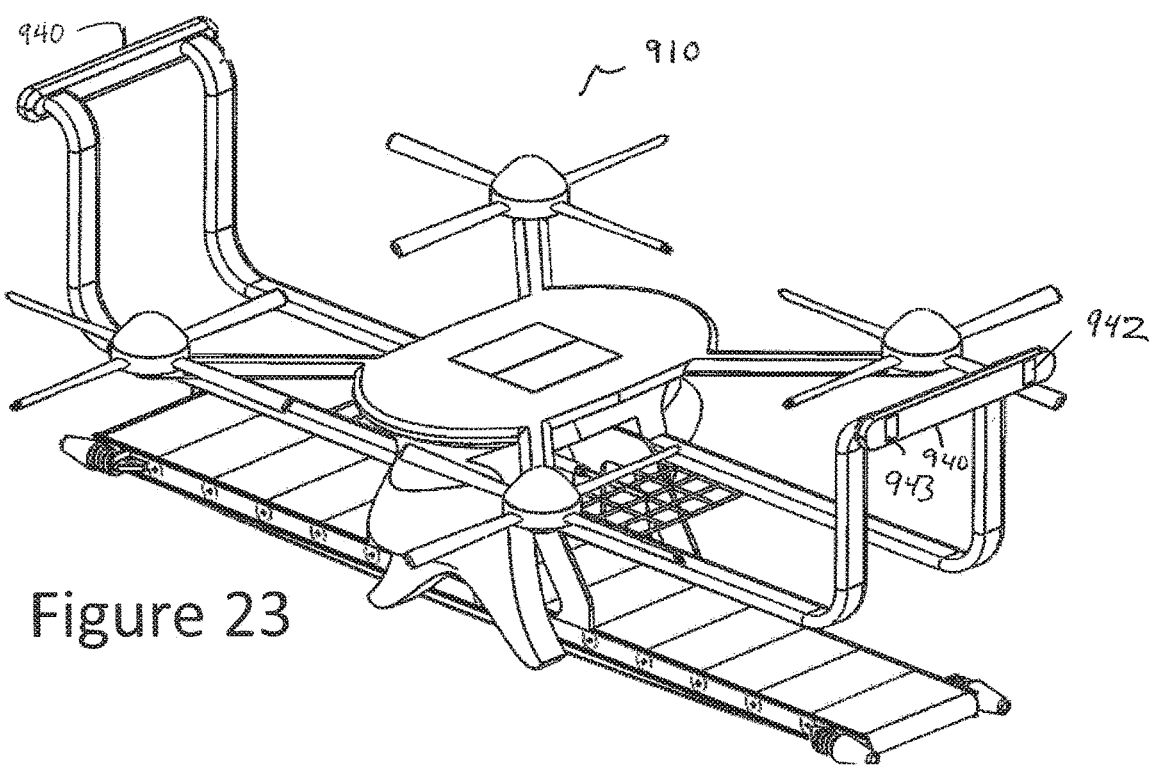
FIG. 23 is an isometric view of a package delivery drone according to another embodiment of the invention.
Figure 24:
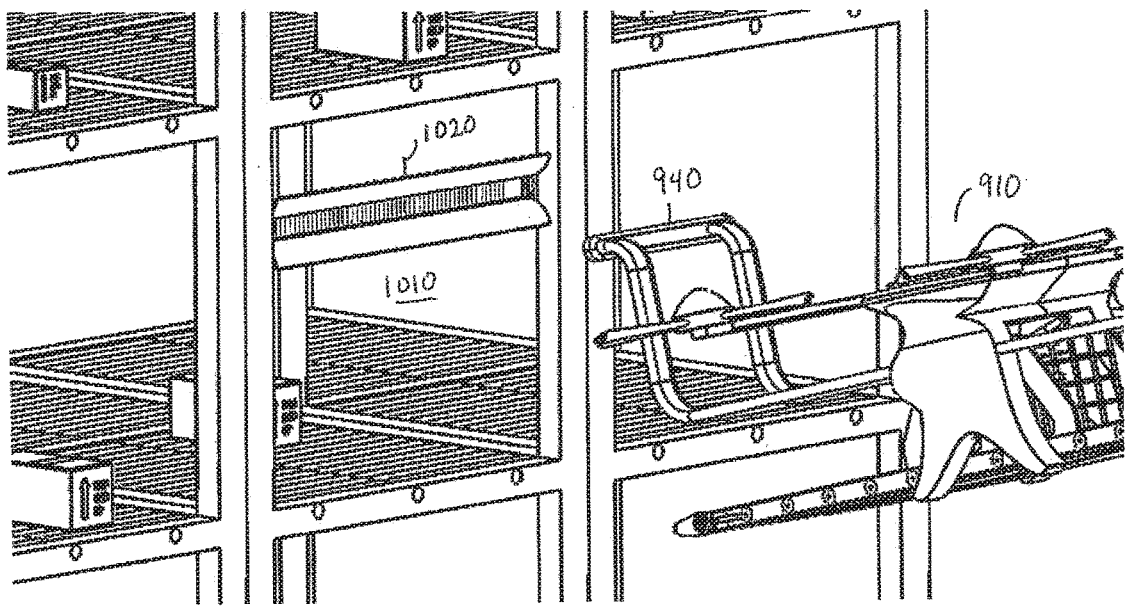
FIG. 24 shows the drone of FIG. 23 approaching a corresponding docking station.

According to another, non-limiting embodiment of the invention, shown in FIGS. 20-22, a drone 710 may include a magnet 742 or other suitable latching device on a laterally-extending docking arm 740. The illustrative docking arm 740 further includes stop guides 743. The associated docking station 810 includes seats 820 for the docking arm 740, a tether 850 terminating in a latching device 852 that is attractive to the magnet 742 and a winch 860 for raising and lowering the latching device 852. The illustrative seats 820 comprise a curved upper wall 821, a curved lower wall 822 that opposes the curved upper wall 821 to form a tapering passage terminating in a seat base 823. To dock the drone 710 at the docking station 810, the drone 710 approaches the docking station 810 so that the magnet 742 is near the latching device 852. The latching devices 742, 852 attract each other to mate the drone with the winch 860, as shown in FIG. 22. Then, the winch raises the coupled drone until the docking arm 740 is vertically level with the seats 820. The winch 860 then rotates to align the drone 710 with the desired docking station, then translates to retract the drone 710 to the docking position. After receipt or delivery of a package, the latch is released. One or both latching devices 742, 852 can be an electromagnet that can be selectively energized to produce an attractive force and de-energized to de-couple the devices, releasing the drone 710.

Referring to FIGS. 23-29, another embodiment of a drone 910 includes a linear magnetic coupling element. The drone 910 includes a docking arm 940 having magnetic elements 942, 943 for engagement and alignment with a docking station. The magnetic elements 942, 943 can comprise any suitable elements, such as permanent magnets, ferrous material or another suitable material arranged in a linear pattern on the docking arm 940. An associated docking station 1010 includes a seat 1020 for the docking arm 940 that includes a shock-mounted bearing and an ironless linear stator.

Figure 25:
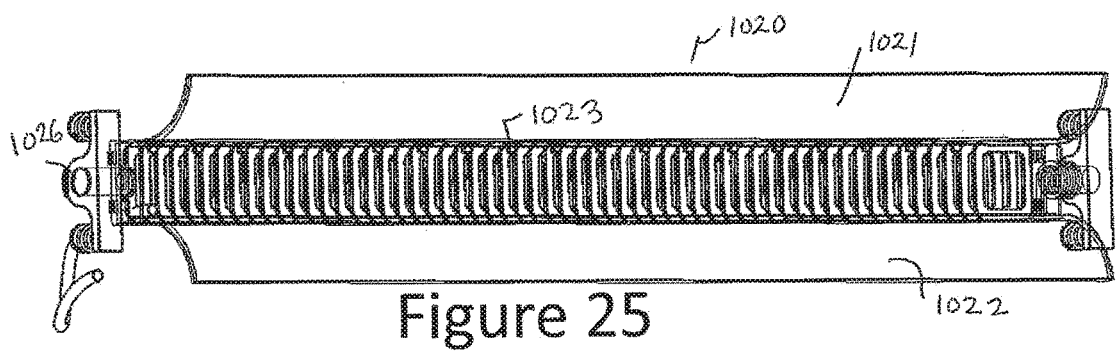
FIG. 25 is a detailed view of the seat of the docking station of FIG. 24.
Figure 26:
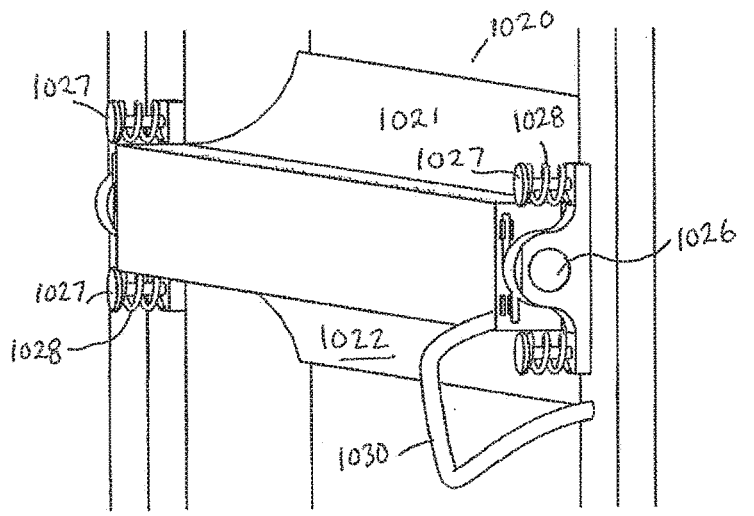
FIG. 26 is a rear view of the docking station seat of FIG. 25.
Figure 27:
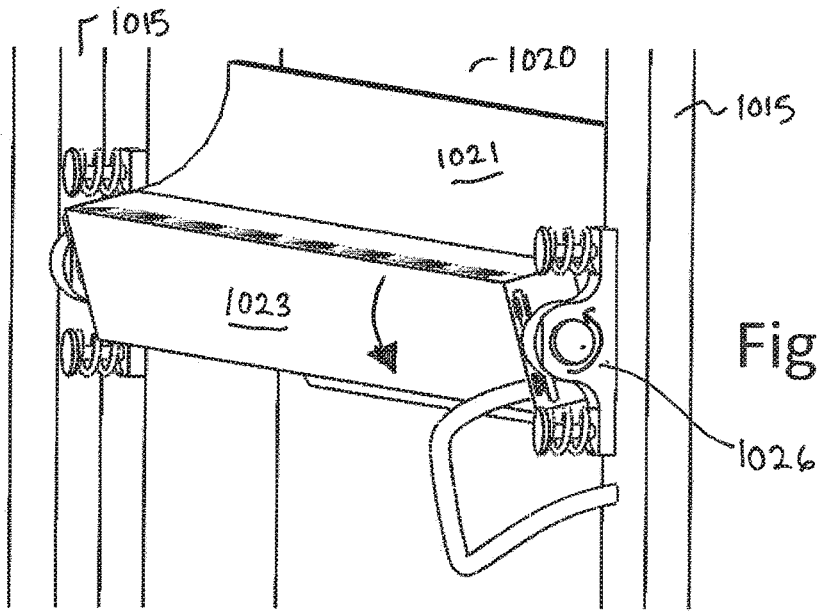
FIG. 27 shows the docking station seat of FIG. 25 in a pivoted-up position.
Figure 28:
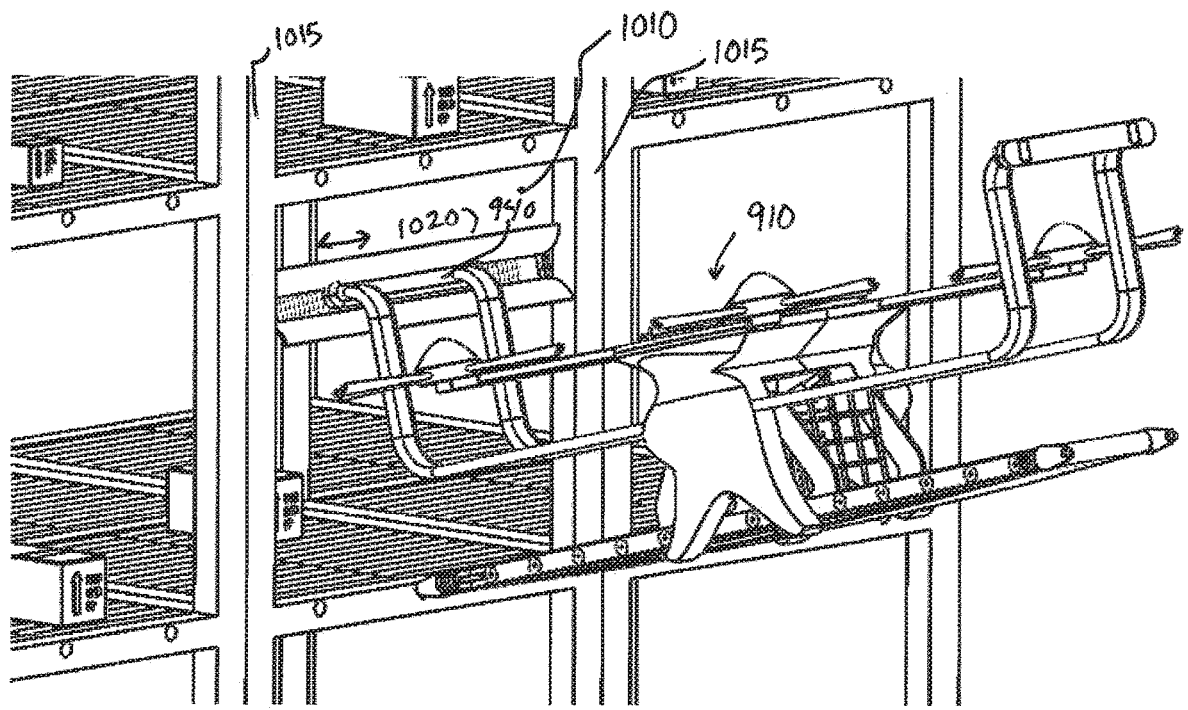
FIG. 28 shows the drone of FIG. 23 in an initial engaged position with the corresponding docking station, ready to translate to a docked position.
Figure 29:
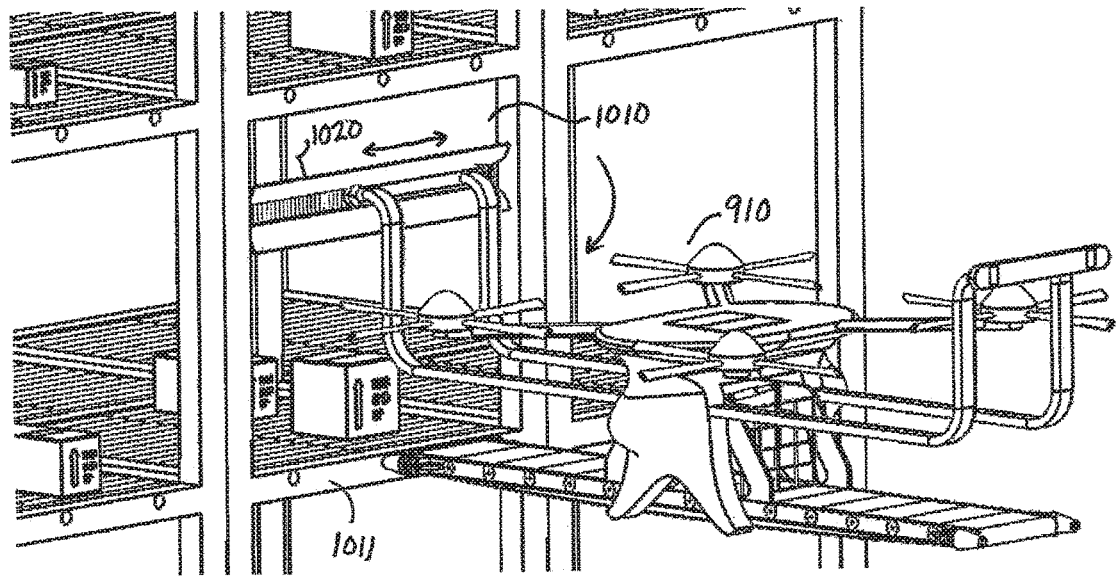
FIG. 29 shows the drone of FIG. 23 in a docked position at the docking station of FIG. 24.

As shown in FIGS. 25-27, the illustrative seat 1020 comprises a curved upper curved wall 1021, a curved lower wall 1022 opposing the curved upper wall to form a tapering channel for the docking arm and a linear stator 1023 forming the back wall. The seat 1020 can be pivotally mounted to vertical members 1015 of the docking station 1010 using bearings 1026, fasteners 1027 and shock-absorbers, such as springs 1028. Power can be supplied via power line 1030. As a drone 910 approaches the docking station 1010, preferably at an angle, as shown in FIGS. 28 and 29, the seat 1020 can rotate to catch the docking arm 940. The stator 1023 can be activated to shift the drone laterally into proper alignment with the shelf 1011 before the drone 910 rotates downwards into engagement with the shelf 1011.

Figure 30:
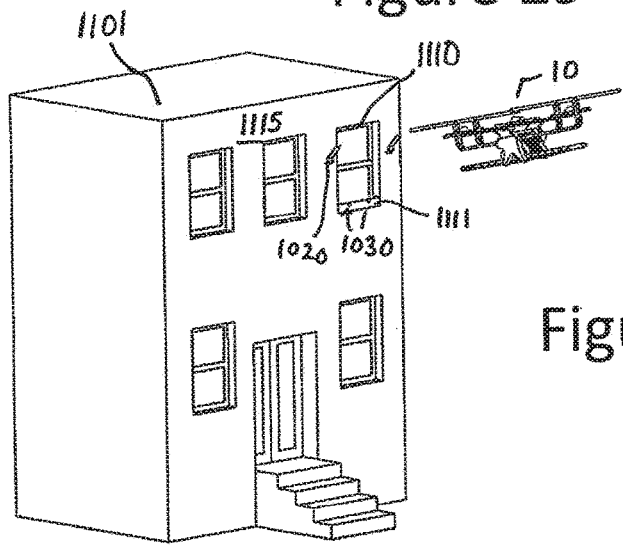
FIG. 30 shows a docking station in a vertical building and an approaching package delivery drone according to another embodiment of the invention.
Figure 31:
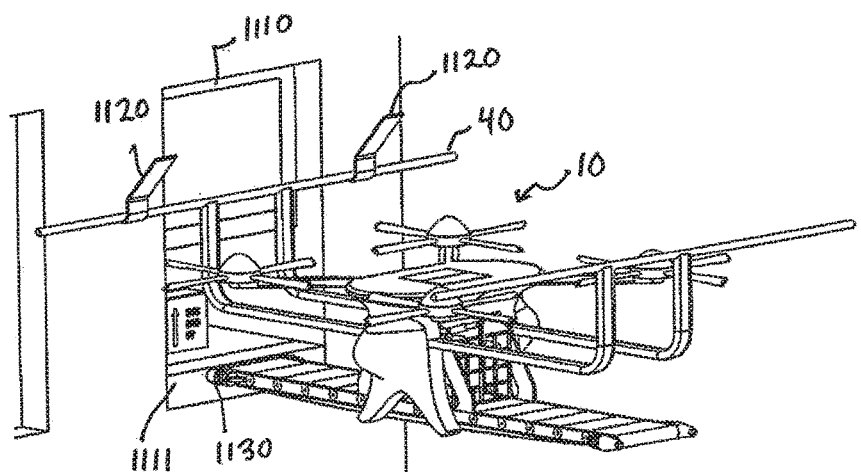
FIG. 31 shows the docking station of FIG. 30 with a package delivery drone in an engaged position.

Referring to FIGS. 30 and 31, a docking station for a delivery drone 10 can be a window 1110, door or other opening in a building 1101, or other vertical structure, such as a ship at sea, a tower or other structure in a remoted area, such as the woods or mountains, designed to receive a drone or other structure. Hooks 1120 or another coupling element for receiving the drone can be attached to outside walls 1115 around the window 1110. Lower receptacles 1130 below the window receive docking cones or other guide devices on the drone to align the drone 10 with a shelf 1111 for receiving or delivering packages from or to the drone. The shelf can include any suitable means for conveying the package to or from the drone. The lower receptacles 1130 can include a power connection for powering the drone 10. The opening, such as the window 1110, can be automatically or manually opened or closed based on the position of an associated drone. Drone proximity to a structure can be detected so that opening of the window can begin in anticipation of the drone docking to accelerate the delivery or retrieval process. The opening can be opened or closed by electrical, pneumatic, hydraulic means or using any suitable type of actuator.

Figure 32:
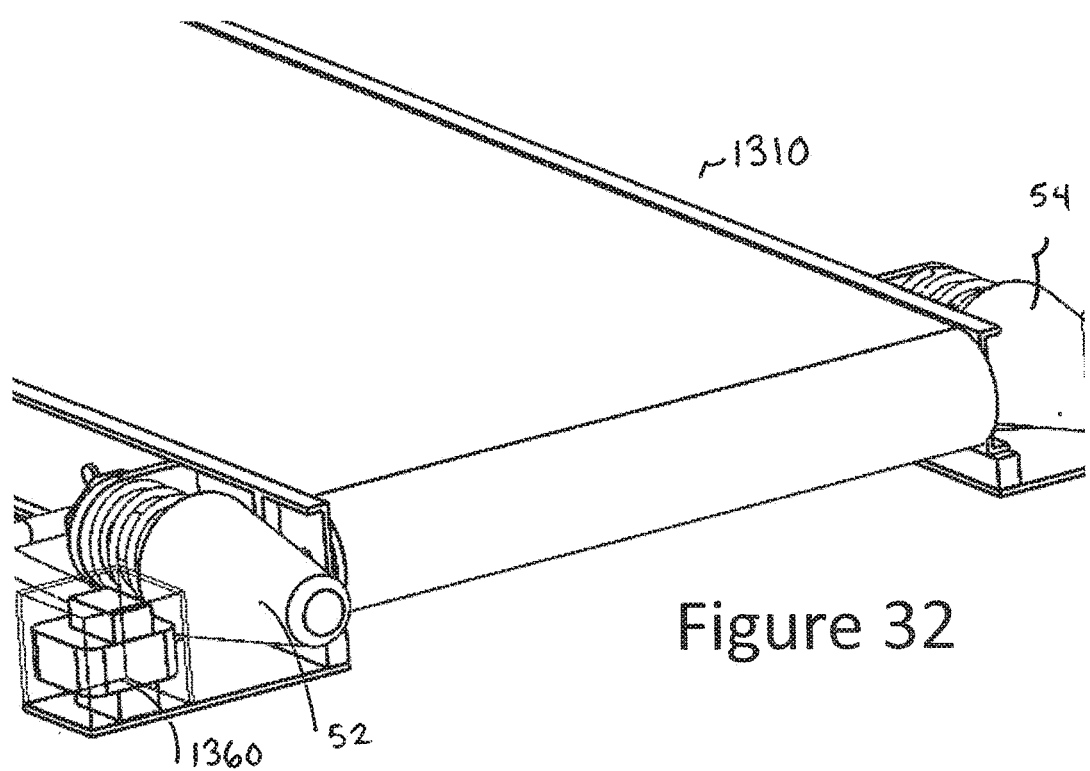
FIG. 32 is a detailed view of a portion of a package delivery drone configured to be powered via a transformative coupling.
Figure 33:
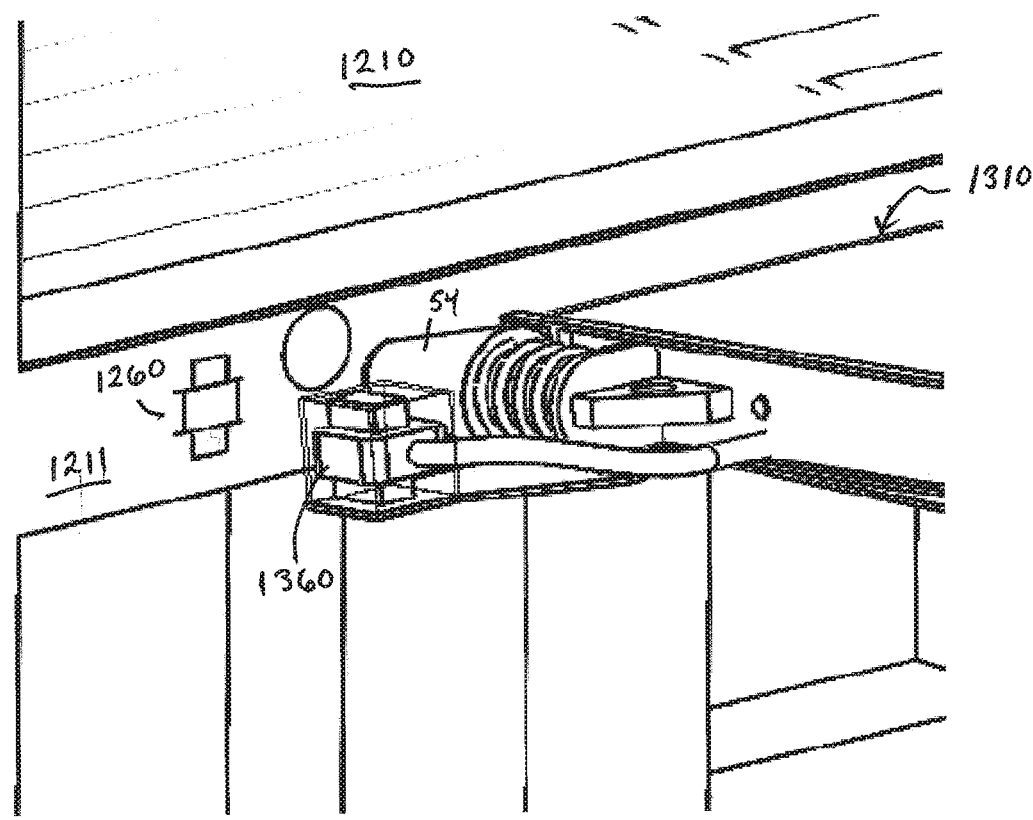
FIG. 33 shows the drone of FIG. 32 as it approaches a docking station configured to charge the drone via a transformative coupling.

As described above, a delivery drone can be powered through contacts in docking cones or other coupling elements used to dock the drone at a docking station. In another embodiment, shown in FIGS. 32 and 33, a delivery drone can be powered via a transformative coupling. To power a delivery drone, whether for charging a battery or powering a conveyor on the drone or other applications, the docking station 1210 may include a primary 1260 mounted in a docking shelf 1211. A secondary 1360 can be mounted to the drone 1310. In the illustrative embodiment, the secondary 1360 is mounted to the side of a conveyor frame on the drone, outside of docking cones 52, 54. The secondary 1360 magnetically mates with the primary 1260 during docking to power the drone 1310. Any suitable means for powering a delivery drone may be used.

In one example, a conveyor belt 22 forming a dynamic support surface may be powered or idle. For example, an on-board motor (not shown) may drive the conveyor belt. In another embodiment, the conveyor belt 22 is passive, so that the momentum of an article coming off an external conveyor pushes the conveyor belt so that the article 40 into the article containment area, or gravity causes the conveyor belt to propel a package towards a docking station. Also, the conveyor belt 22 may be capable of reversing. In another embodiment, the conveyor belt is mechanically operated by rollers in the docking station driving wheels that move the conveyor belt.

Figure 34:
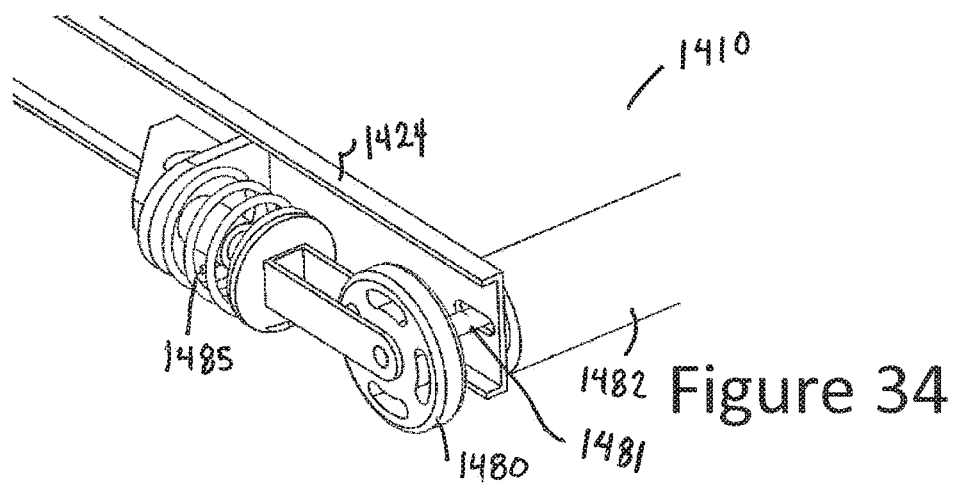
FIG. 34 is a detailed view of a portion of a package delivery drone having a conveyor belt configured to be driven by rollers at a docking station.
Figure 35:
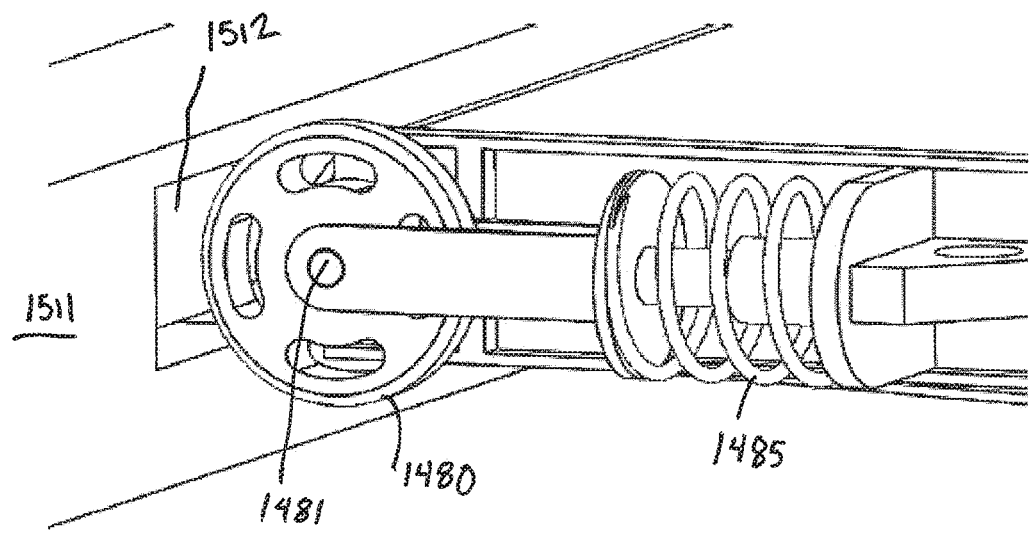
FIG. 35 shows the drone of FIG. 34 in a docked position with a docking station having embedded rollers for driving the conveyor belt.

For example, as shown in FIGS. 34 and 35, a delivery drone 1410 may include drive wheels 1480 mounted on a drive shaft 1481 on either side of a conveyor frame 1424. The drive shaft 1481 drives sprockets, rollers or any suitable drive 1482 for a conveyor belt used for moving articles into and out of an article containment area of the drone. An associating docking station may include powered rollers 1512 in a shelf 1511. When docked, the rollers 1512 contact and move the drive wheels 1480 to activate the conveyor belt. The illustrative wheels 1480 are spring-mounted using springs 1485 to dampen the contact between the shelf 1511 and drone 1410.

Figure 36:
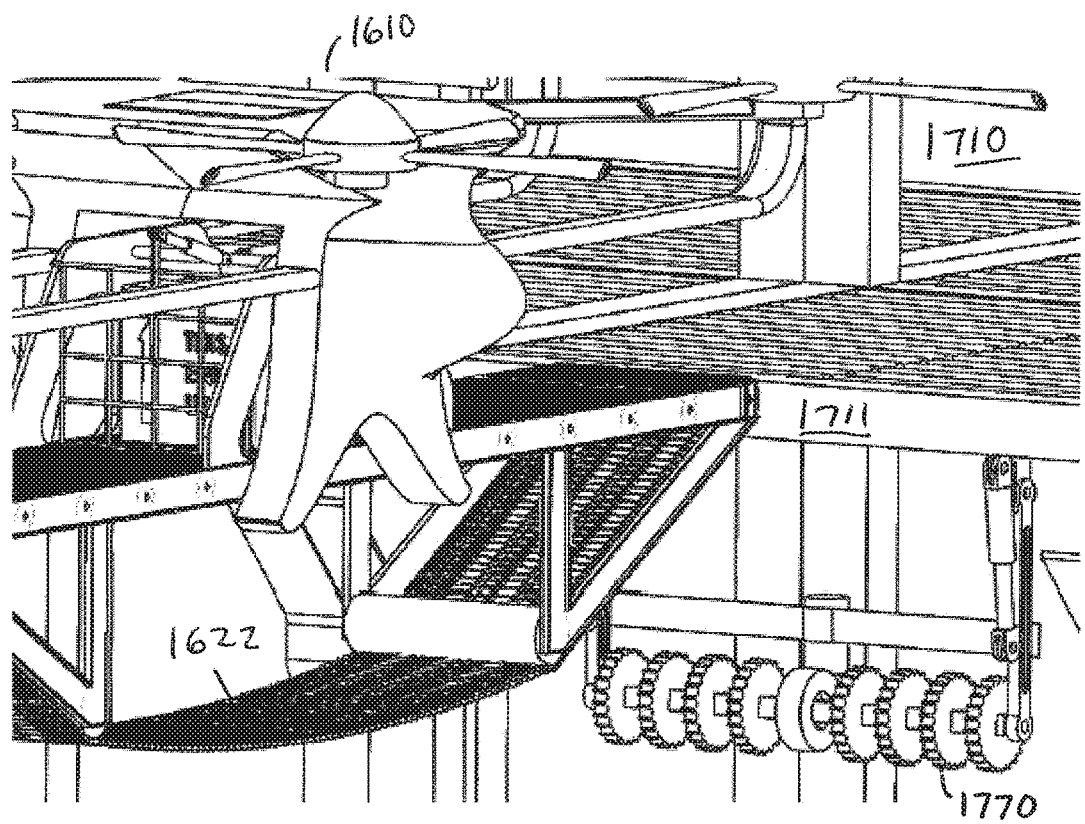
FIG. 36 shows a package delivery drone engaging a docking station having an array of sprockets for driving a conveyor belt on the package delivery drone according to another embodiment of the invention.
Figure 37:
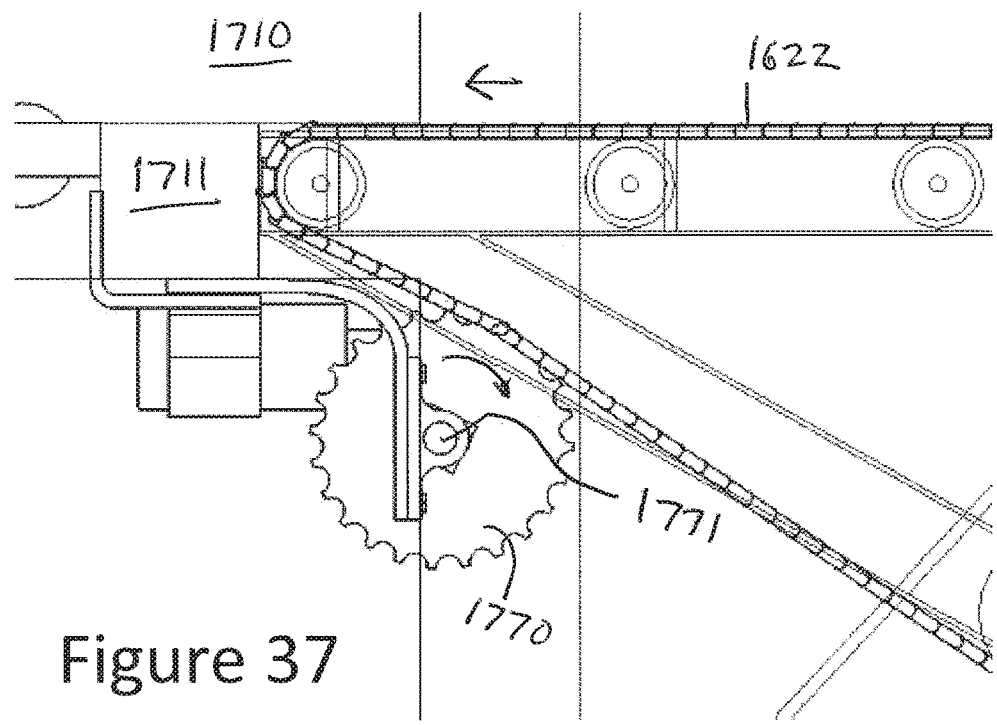
FIG. 37 is a side view of a portion of the package delivery drone and docking station of FIG. 36, while the sprockets engage the conveyor belt on the package delivery drone

In another embodiment, sprockets mounted below a shelf at a docking station can drive a conveyor belt on a delivery drone. For example, FIGS. 36 and 37 shows a delivery drone 1610 including a modular plastic, positive drive conveyor belt 1622 for moving an article into and out of an article containment area. An associated docking station 1710 includes a series of sprockets 1770 mounted on a drive shaft 1771 below a shelf 1711 and driven by a motor 1772. The sprockets and motor can pivot, swivel, or translate so that the sprockets 1770 mate with the belt drive surfaces on the conveyor belt 1622 after or just before the drone docking is complete. In another embodiment, the sprockets and motor are fixedly mounted into a recess built into the docking station shelf. Driving the belt from the rack saves power and reduces the overall weight of the drone. The motor and sprockets could be mounted on leaf springs or other suitable shock absorbers.

In another embodiment, the conveyor belt 22 is driven via a worm gear extending through a drone leg, allowing the motor and other electrical components to be housed in the main body of the drone. In another embodiment, a timing belt driven by a motor in the main body connects the motor to the shaft that turns the conveyor belt.

Figure 38:
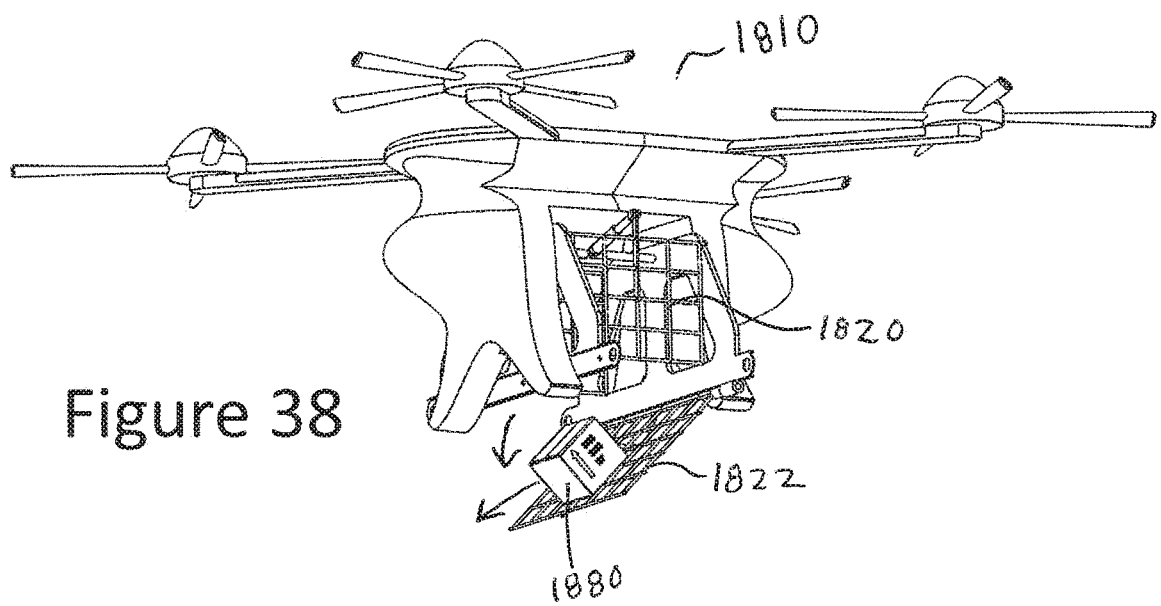
FIG. 38 is an isometric view of a delivery drone including a tiltable support surface according to another embodiment of the invention
Figure 39:
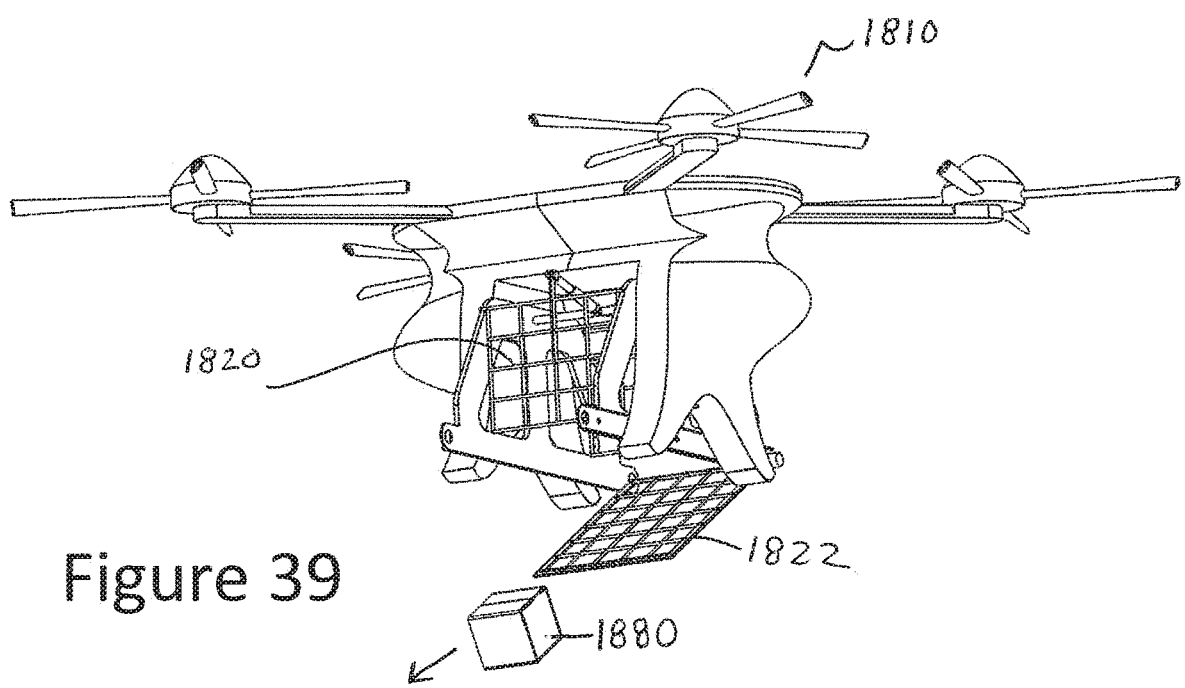
FIG. 39 is another view of the delivery drone of FIG. 38.

In another embodiment, shown in FIGS. 38 and 39, a dynamic support surface for a drone 1810 comprises a hinged door 1822 forming the floor of the article containment area 1820. To discharge a package 1880 from the drone 1810, the door 1822 opens to tilt downwards, causing the package 1880 to deploy from the article containment area.

Figure 40:
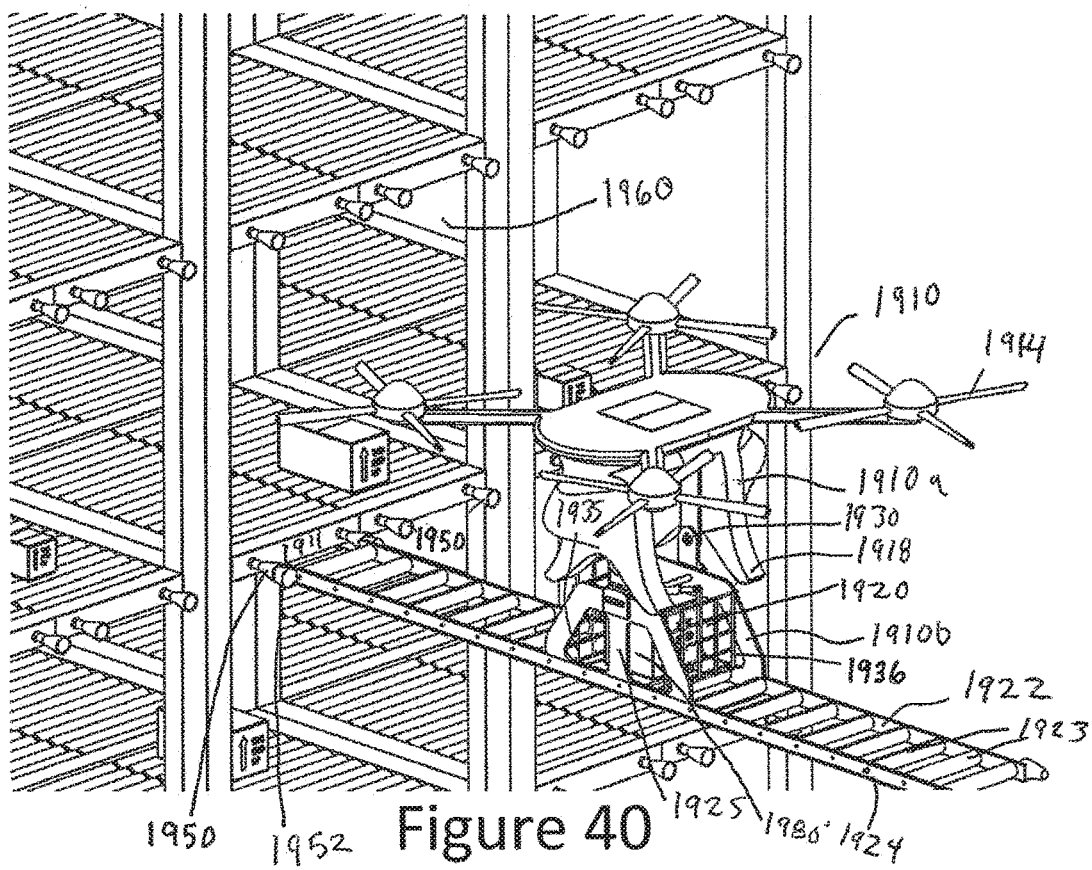
FIG. 40 shows a delivery drone and docking station according to another embodiment.
Figure 41:
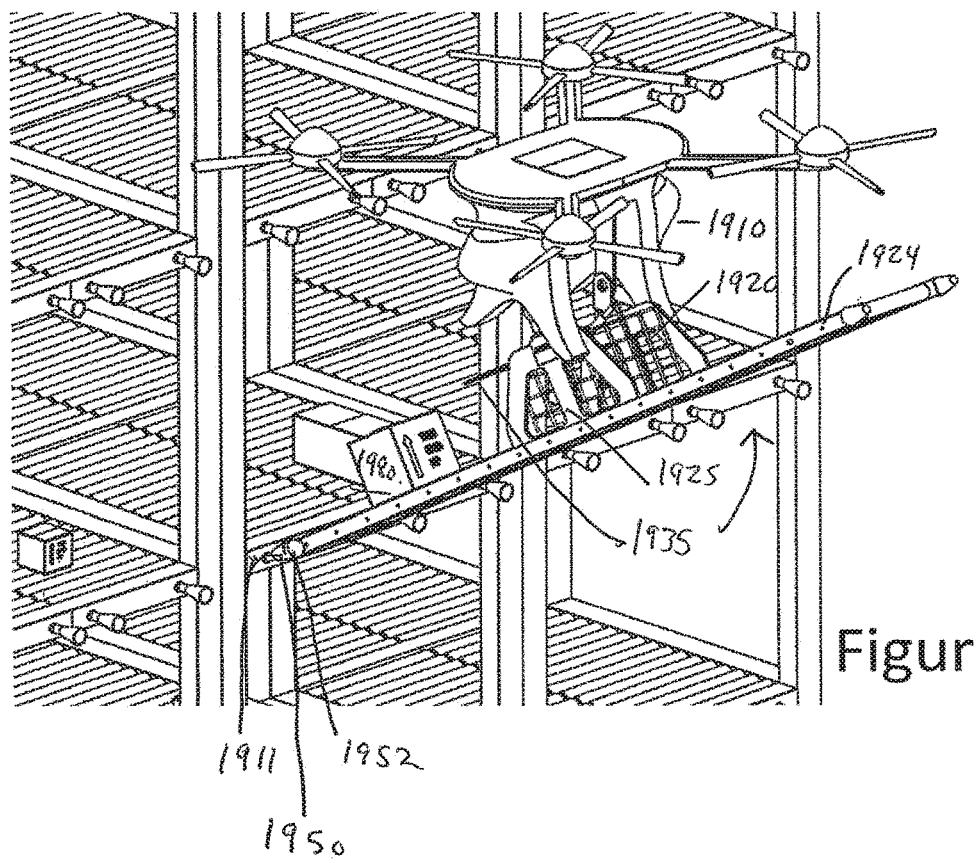
FIG. 41 shows the delivery drone of FIG. 40 in a tilted position for release of a package to the docking station.

FIGS. 40 and 41 shows another embodiment of a delivery drone 1910 including a dynamic support surface. The delivery drone 1910 includes a frame portion 1910*a* containing propellers 1914 and feet 1918 and an article containing module 1910*b*. The article containing module 1910*b* includes a dynamic support surface 1922, shown as a series of rollers 1923 mounted to a frame 1924, and an article containment area 1920. The article containment area 1920 sides comprise gates 1935, 1936 and side walls 1925, and the floor of the article containment area comprises a portion of the dynamic support surface 1922. The article containing module 1190*b* is attached to the frame portion 1910*a* using lockable swivel elements 1930 that allow the entire dynamic support surface 1922 to swivel, to release a package 1980 to a shelf 1911 of a docking station 1960. In one embodiment, the docking station 1960 includes swiveling docking elements 1950 in the shelf 1911 to facilitate discharge of the package. The illustrative delivery drone 1910 could dock at the docking station with the dynamic support surface level and aligned with the shelf 1911, so that docking cones 1952 are inserted in the swiveling docking elements 1950, as shown in FIG. 40. Then, the locking swivel elements 1950 in the drone 1910 can be released, and the frame portion 1910*a* can rise in altitude while the article containing module 1910*b* remains engaged with the docking station. This causes the free end of the dynamic support surface to rise, while the docked end remains fixed, causing the conveyor to tilt towards the shelf 1911, as shown in FIG. 41. Once a sufficient tilt angle is attained, the retaining door 1935 opens allowing the package 1912 to glide down to the delivery shelf. After delivery, the drone 1910 can lower again to level the dynamic support surface 1922, lock the swivel elements 1950 and depart. Alternatively, the docking cones 1952 can be allowed to swivel relative to the frame 1924 to allow tilting of the dynamic support surface. The docking cones and docking elements are not limited to the illustrative embodiment, and ay suitable means for docking the drone can be used. In one embodiment, the docking is facilitated by magnetic elements or other mechanical elements.

Figure 42:
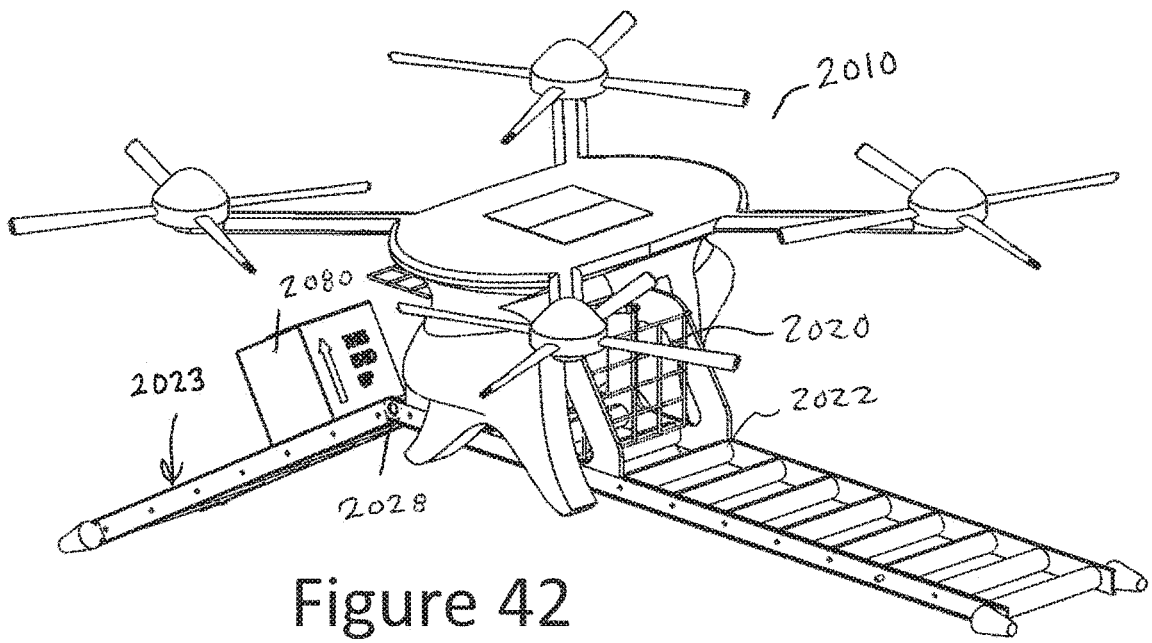
FIG. 42 is an isometric view of a delivery drone with a tiltable surface according to another embodiment.

In still another embodiment, a package delivery drone can comprise a dynamic support surface for a package that tilts in one or more locations. For example, as shown in FIG. 42, a package deliver drone 2010 includes a dynamic support surface 2022 including a tiltable section 2023 outside of the article containment area 2020. A second tiltable section could be formed on the other side of the article containment area 2020. The tiltable section is connected using swivels 2028. To deploy a package, the drone 2010 can tilt, then open a door 2035 to the article containment are to move the package 2080 onto the tilted section 2023, which then pushes the package off the drone 2010.

Figure 43:
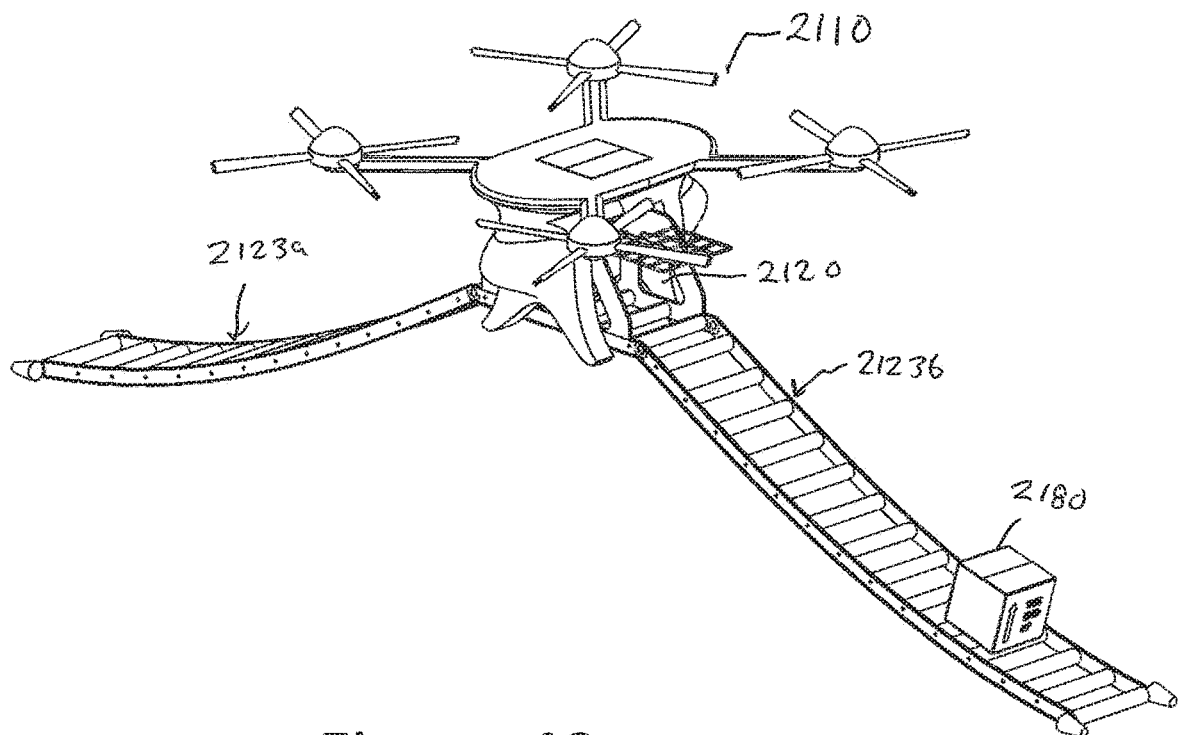
FIG. 43 is an isometric view of a delivery drone with curved tiltable surfaces according to another embodiment.

As shown in FIG. 43, one or more tiltable sections 2123*a*, 2123*b* in a package delivery drone 2110 can be curved, for example, in a catenary shape, as shown, to facilitate package deployment. One or both sections can selectively tilt to deploy a package from the package containment area 2120 of the drone 2110.

While the illustrative article containment areas are below the propellers, in another embodiment of the invention, the article containment area is above the propellers or in another suitable location.

A dynamic support surface employing a conveyor belt 22 can comprise any suitable type of conveyor. For example, the conveyor belt can be a positive drive conveyor belt, a friction driven conveyor belt or other type of conveyor belt. The conveyor belt can be formed of plastic, stainless steel or other metal, fiber, rubber or any suitable material. The conveyor belt can be a flat or textured. The conveyor belt can have a closed or open surface and comprise rollers, slats or any other feature suitable for moving articles. Other movable, retractable or otherwise dynamic support surfaces can also be used.

Although the invention has been described in detail with reference to a few exemplary versions, other versions are possible. So, as these few examples suggest, the scope of the claims is not meant to be limited to the versions described in detail.

What is claimed is:

1. A system for storing and retrieving packages, comprising:
   a drone having a frame, at least one propeller for generating aerodynamic lift, an article containment area having a bottom formed by a dynamic support surface, a first coupling element above the article containment area and docking cones extending from an end of the article containment area; and
   a docking station for the drone, comprising a shelf for a package, a second coupling element for mating with the first coupling element and allowing pivoting of the drone about the second coupling element, the docking station further including receptacles in the shelf for receiving the docking cones, such that the dynamic support surface of the article containment area aligns with the shelf.

2. The system of claim 1, wherein the first coupling element comprises one of a bar, a hook and a magnet.

3. The system of claim 1, wherein the docking cones include charging contacts and the receptacles include pins for supplying power to the drone.

4. The system of claim 1, wherein the dynamic support surface comprises a conveyor belt trained about a conveyor frame and forming the bottom of the article containment area.

5. The system of claim 4, wherein the drone further comprises one or more gates that can be activated to open and close the article containment area.

6. The system of claim 4, wherein the docking station includes a driver for driving the conveyor belt.

7. The system of claim 1, wherein the shelf comprises a conveyor.

8. The system of claim 1, wherein the docking station comprises a window in a building.

9. The system of claim 1, wherein the frame and propeller are formed in a first module and the article containment area is formed in a second module coupled to the first module to form the drone.

10. The system of claim 1, wherein the first coupling element includes a docking bar and the second coupling element comprises hooks extending from a vertical member for receiving the docking bar.

11. The system of claim 10, wherein each hook comprises an upper section comprising a planar portion extending at an angle relative to the vertical member and a lower section comprising a curved seat for pivotally receiving the docking bar.

12. A method of docking a drone at a docking station having a shelf and receptacles formed in the shelf for package exchange, comprising the steps of:

approaching a first coupling element at the docking station, wherein the first coupling element is above the shelf;

guiding a second coupling element on the drone into the first coupling element at the docking station, wherein the drone includes an article containment area and docking cones, and the second coupling element is above the article containment area; and aligning an article containment area of the drone with a shelf at the docking station by first pivoting the drone down about the first coupling element and then inserting docking cones in the receptacles formed in the shelf.

13. The method of claim 12, further comprising the step of actuating a conveyor forming a dynamic support surface on the drone to move a package into or out of the article containment area.

14. The method of claim 12, further comprising the step of actuating a conveyor in the shelf to move a package onto or from the drone.

15. The method of claim 12, further comprising the step of charging the drone while docked.

\* \* \* \* \*